(12) United States Patent
Kim et al.

(10) Patent No.: US 12,191,483 B2
(45) Date of Patent: Jan. 7, 2025

(54) POSITIVE ELECTRODE ACTIVE MATERIAL COMPRISING SULFUR-CARBON COMPOSITE AND LITHIUM-SULFUR SECONDARY BATTERY COMPRISING THE SAME

(71) Applicant: LG ENERGY SOLUTION, LTD., Seoul (KR)

(72) Inventors: Min-Su Kim, Daejeon (KR); Da-Young Kang, Daejeon (KR); Bong-Soo Kim, Daejeon (KR); Seung-Bo Yang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/518,749

(22) Filed: Nov. 24, 2023

(65) Prior Publication Data
US 2024/0178381 A1 May 30, 2024

Related U.S. Application Data

(63) Continuation-in-part of application No. 18/244,083, filed on Sep. 8, 2023, now abandoned.

(30) Foreign Application Priority Data

Nov. 25, 2022 (KR) .................. 10-2022-0159965
Dec. 23, 2022 (KR) .................. 10-2022-0183586
(Continued)

(51) Int. Cl.
| | | |
|---|---|---|
| H01M 4/38 | (2006.01) | |
| H01M 4/02 | (2006.01) | |
| H01M 4/36 | (2006.01) | |
| H01M 4/583 | (2010.01) | |

(52) U.S. Cl.
CPC ............ H01M 4/382 (2013.01); H01M 4/362 (2013.01); H01M 4/583 (2013.01); *H01M 2004/028* (2013.01)

(58) Field of Classification Search
CPC ...... H01M 4/382; H01M 4/362; H01M 4/583; H01M 2004/028
See application file for complete search history.

(56) References Cited

U.S. PATENT DOCUMENTS

| | | | | |
|---|---|---|---|---|
| 2003/0113624 A1* | 6/2003 | Kim | ...................... | H01M 4/364 |
| | | | | 429/231.95 |
| 2012/0177923 A1* | 7/2012 | Kumara | ................ | C01B 32/336 |
| | | | | 423/445 R |

(Continued)

FOREIGN PATENT DOCUMENTS

| | | |
|---|---|---|
| CN | 111799459 A | 10/2020 |
| CN | 113233451 A | 8/2021 |

(Continued)

OTHER PUBLICATIONS

Ding et al. "Key parameters in design of lithium sulfur batteries", Journal of Power Sources, vol. 269, Jul. 9, 2014, pp. 111-116.

*Primary Examiner* — Helen Oi K Conley
(74) *Attorney, Agent, or Firm* — Bryan Cave Leighton Paisner LLP

(57) ABSTRACT

The present disclosure relates to a positive electrode active material for a lithium-sulfur battery, and the positive electrode active material of the present disclosure includes a sulfur-carbon composite, wherein the sulfur-carbon composite includes a porous carbon material and a sulfur-based material disposed on at least a portion of an inside of pores and a surface of the porous carbon material, wherein the sulfur-based material includes at least one of sulfur ($S_8$) or a sulfur compound, and wherein the porous carbon material satisfies one or more of the following conditions:

(Continued)

(1) a sum of particle size $D_{10}$ and particle size $D_{90}$ is 60 µm or less; and
(2) a broadness factor (BF) satisfying Equation 1 is 7 or less:

$$\text{Broadness factor }(BF) = (\text{particle size } D_{90} \text{ of the porous carbon material})/(\text{particle size } D_{10} \text{ of the porous carbon material}) \quad \text{[Equation 1]}.$$

20 Claims, 17 Drawing Sheets

(30) Foreign Application Priority Data

| Dec. 23, 2022 | (KR) | 10-2022-0183771 |
|---|---|---|
| Dec. 27, 2022 | (KR) | 10-2022-0185613 |
| May 16, 2023 | (KR) | 10-2023-0063394 |
| May 31, 2023 | (KR) | 10-2023-0070299 |
| Jun. 7, 2023 | (KR) | 10-2023-0073163 |
| Jun. 13, 2023 | (KR) | 10-2023-0075765 |

(56) References Cited

U.S. PATENT DOCUMENTS

| 2016/0248087 A1 | 8/2016 | Kim et al. |
|---|---|---|
| 2020/0220169 A1 | 7/2020 | Kim et al. |
| 2020/0350560 A1 | 11/2020 | Korzhenko et al. |
| 2021/0119210 A1 | 4/2021 | Korzhenko et al. |
| 2021/0143407 A1 | 5/2021 | Cho et al. |

FOREIGN PATENT DOCUMENTS

| JP | 10-286479 A | 10/1998 |
|---|---|---|
| JP | 11-102702 A | 4/1999 |
| JP | 2006-274189 A | 10/2006 |
| JP | 2016-91638 A | 5/2016 |
| JP | 2017-62898 A | 3/2017 |
| JP | 2022-517022 A | 3/2022 |
| KR | 10-2015-0014793 A | 2/2015 |
| KR | 10-2015-0045363 A | 4/2015 |
| KR | 10-2016-0037084 A | 4/2016 |
| KR | 10-2019-0056484 A | 5/2019 |
| KR | 10-2019-0060262 A | 6/2019 |
| KR | 10-2020-0036253 A | 4/2020 |
| KR | 10-2020-0050583 A | 5/2020 |
| KR | 10-2020-0095549 A | 8/2020 |
| KR | 10-2020-0113979 A | 10/2020 |
| KR | 10-2020-0139818 A | 12/2020 |
| KR | 10-2020-0144719 A | 12/2020 |
| KR | 10-2021-0024581 A | 3/2021 |
| KR | 10-2021-0088025 A | 7/2021 |
| KR | 10-2022-0141023 A | 10/2022 |
| WO | 2020-002550 A1 | 1/2020 |
| WO | 2022-181447 A | 9/2022 |

* cited by examiner

POSITIVE ELECTRODE ACTIVE MATERIAL COMPRISING SULFUR-CARBON COMPOSITE AND LITHIUM-SULFUR SECONDARY BATTERY COMPRISING THE SAME

CROSS-REFERENCE TO RELATED APPLICATIONS

This application is a continuation-in-part of U.S. patent application Ser. No. 18/244,083, filed on Sep. 8, 2023, which claims the benefit of and priority to Korean Patent Application No. 10-2022-0159965, filed on Nov. 25, 2022, Korean Patent Application No. 10-2022-0183586, filed on Dec. 23, 2022, Korean Patent Application No. 10-2022-0183771, filed on Dec. 23, 2022, Korean Patent Application No. 10-2022-0185613, filed on Dec. 27, 2022, Korean Patent Application No. 10-2023-0063394, filed on May 16, 2023, Korean Patent Application No. 10-2023-0070299, filed on May 31, 2023, Korean Patent Application No. 10-2023-0073163, filed on Jun. 7, 2023, and Korean Patent Application No. 10-2023-0075765, filed on Jun. 13, 2023, the disclosures of which are incorporated herein by reference in their entirety.

TECHNICAL FIELD

The present disclosure relates to a positive electrode active material comprising a sulfur-based material and a lithium-sulfur secondary battery with high energy density and improved output characteristics, comprising the positive electrode active material.

BACKGROUND OF THE INVENTION

A lithium-sulfur battery is a battery system using a sulfur-based material having a sulfur-sulfur (S—S) bond for a positive electrode active material and a lithium metal for a negative electrode active material. Sulfur, the main component of the positive electrode active material, is abundant in nature and can be found around the world, is non-toxic and has low atomic weight.

As secondary batteries are used in a wide range of applications including electric vehicles (EVs) and energy storage systems (ESSs), attention is drawn to lithium-sulfur batteries theoretically having higher energy storage density by weight (~2,600 Wh/kg) than lithium-ion secondary batteries having lower energy storage density by weight (~250 Wh/kg).

During discharging, lithium-sulfur batteries undergo oxidation at the negative electrode active material, lithium, by releasing electrons into lithium cation, and reduction at the positive electrode active material, the sulfur-based material, by accepting electrons. Through the reduction reaction, the sulfur-based material is converted to sulfur anion by the S—S bond accepting two electrons. The lithium cation produced by the oxidation reaction of lithium migrates to the positive electrode via an electrolyte, and bonds with the sulfur anion produced by the reduction reaction of the sulfur-based compound to form a salt. Specifically, sulfur before the discharge has a cyclic $S_8$ structure, and it is converted to lithium polysulfide ($Li_2S_x$, $1 \le x \le 8$) by the reduction reaction and is completely reduced to lithium sulfide ($Li_2S$).

Since sulfur used in the positive electrode active material is non-conductive, to improve the reactivity of sulfur, studies have been made on porous carbon materials as sulfur hosts. To improve the dynamic activity of electrochemical reaction during charging/discharging of lithium-sulfur secondary batteries, there is a continuous need for the technology development for sulfur-carbon composites in which the positive electrode active material is loaded onto the porous carbon materials as positive electrode materials.

In particular, when sulfur is loaded onto the porous carbon materials theoretically having large specific surface area, high sulfur content improves the energy density and life characteristics of the batteries. However, experimentally, when sulfur is loaded using the porous carbon materials having large specific surface area, it results in non-uniform battery capacity, low tap density when forming the electrode and low compaction ratio during rolling, causing swelling in the electrodes, thereby making it difficult to manufacture and commercialize the electrodes.

In these circumstances, efforts are being made to study and develop sulfur-carbon composites of various properties for use in lithium-sulfur secondary batteries.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY OF THE INVENTION

The present disclosure is designed to solve the above-described problem, and therefore the present disclosure is directed to a positive electrode active material comprising a porous carbon material having a controlled particle size distribution as a sulfur host for uniform electrochemical reactivity of sulfur, and an electrode and a battery using the same.

Specifically, the present disclosure is directed to a lithium-sulfur battery with improved energy density, capacity and electrochemical reaction uniformity by reducing the particle size of the porous carbon material used as a sulfur host and adjusting a particle size distribution to a predetermined ratio.

To solve the above-described problem, the present disclosure according to an aspect provides a positive electrode active material for a lithium-sulfur battery of the following embodiments.

The positive electrode active material according to a first embodiment comprises a sulfur-carbon composite, wherein the sulfur-carbon composite comprises a porous carbon material and a sulfur-based material loaded onto all or at least a portion of inner pores and outer surfaces of the porous carbon material, the sulfur-based material comprises at least one of sulfur ($S_8$) or a sulfur compound, and wherein the porous carbon material satisfies one or more of the following conditions:

(1) a sum of particle size $D_{10}$ and particle size $D_{90}$ is 60 µm or less; and
(2) a broadness factor (BF) satisfying Equation 1 is 7 or less:

$$\text{Broadness factor } (BF) = (\text{particle size } D_{90} \text{ of the porous carbon material})/(\text{particle size } D_{10} \text{ of the porous carbon material}). \quad [\text{Equation 1}]$$

According to a second embodiment, in the first embodiment, the sulfur-based material may comprise at least one selected from the group consisting of inorganic sulfur ($S_8$), $Li_2S_n (n \ge 1)$, an organic sulfur compound including at least one of 2,5-dimercapto-1,3,4-thiadiazole or 1,3,5-trithiocyanuic acid; a carbon-sulfur polymer (($C_2S_x)_n$, x is 2.5 to 50, n≥2) and a combination thereof.

According to a third embodiment, in the first or second embodiment, the porous carbon material may have a Brunauer, Emmett and Teller (BET) surface area of 100 $m^2$/g or more.

According to a fourth embodiment, in any one of the first to third embodiments, the porous carbon material may comprise at least one selected from activated carbon, carbon black, carbon nanotubes and graphene.

According to a fifth embodiment, in any one of the first to fourth embodiments, the porous carbon material may comprise carbon nanotubes.

According to a sixth embodiment, in any one of the first to fifth embodiments, the porous carbon material may have a particle size $D_{50}$ of 100 μm or less.

According to a seventh embodiment, in any one of the first to sixth embodiments, an amount of sulfur (S) may be 60 wt % or more and less than 100 wt % based on 100 wt % of the sulfur-carbon composite.

According to an eighth embodiment, in any one of the first to seventh embodiments, the porous carbon material may be a product from which a raw material porous carbon material is centrifugally milled and filtered through a sieve having a mesh size 2.8 to 4 times of a particle size $D_{50}$ of the porous carbon material.

According to a ninth embodiment, in any one of the first to eighth embodiments, the porous carbon material may satisfy the broadness factor (BF) of 4 to 7.

According to another aspect of the present disclosure, there is provided a positive electrode of the following embodiments.

The positive electrode according to a tenth embodiment comprises a current collector and a positive electrode active material layer on at least one surface of the current collector, wherein the positive electrode active material layer comprises the positive electrode active material for the lithium-sulfur battery according to any one of the first to ninth embodiments.

The positive electrode according to an eleventh embodiment comprises a current collector; and a positive electrode active material layer on at least one surface of the current collector, wherein the positive electrode active material layer comprises a plurality of sulfur-carbon composites, wherein the positive electrode satisfies Equation 2:

$X_L/X_S \leq 15$        [Equation 2]

wherein $X_L$ is an average value of longest axis lengths in top five sulfur-carbon composites on an area basis in a top view image of the positive electrode active material layer, and wherein $X_S$ is an average value of longest axis lengths in bottom five sulfur-carbon composites on the area basis in the top view image of the positive electrode active material layer.

According to a twelfth embodiment, in the tenth or the eleventh embodiment, the top view image of the positive electrode active material layer may be a scanning electron microscope (SEM) image of an upper surface of the positive electrode active material layer.

According to a thirteenth embodiment, in any one of the tenth to twelfth embodiments, the bottom five sulfur-carbon composites may exclude a particle having the longest axis length of less than 1 μm.

According to a fourteenth embodiment, in any one of the tenth to the thirteenth embodiments, the top five sulfur-carbon composites and the bottom sulfur-carbon composites may be independently selected from an area of 50 μm×50 μm to an area of 1,000 μm×1,000 μm in the top view image.

According to a fifteenth embodiment, in the tenth or the fourteenth embodiment, the positive electrode active material layer may have an average tortuosity of 1.7 or less.

According to a sixteenth embodiment, in any one of the tenth to fifteenth embodiments, the positive electrode active material layer may further comprise one or more of a binder and a conductive material.

According to a seventeenth embodiment, in any one of the tenth to the sixteenth embodiments, an amount of sulfur (S) in the positive electrode active material layer may be 60 wt % or more and less than 100 wt % based on 100 wt % of the positive electrode active material layer.

According to a eighteenth embodiment, in any one of the tenth to seventeenth embodiments, a sulfur loading of the positive electrode may be 1.67 mg/$cm^2$ to 2.92 mg/$cm^2$.

According to a nineteenth embodiment, in any one of the eleventh to eighteenth embodiments, each of the plurality of sulfur-carbon composites comprises a porous carbon material, and wherein the porous carbon material satisfies one or more of the following conditions:

(1) a sum of particle size $D_{10}$ and particle size $D_{90}$ is 60 μm or less; and (2) a broadness factor (BF) satisfying Equation 1 is 7 or less:

Broadness factor (BF)=(particle size $D_{90}$ of the porous carbon material)/(particle size $D_{10}$ of the porous carbon material).      [Equation 1]

According to still another aspect of the present disclosure, there is provided a lithium-sulfur battery of the following embodiments.

The lithium-sulfur battery according to a twentieth embodiment comprises an electrode assembly comprising the positive electrode according to any one of the tenth to nineteenth embodiments, a negative electrode and a separator between the positive electrode and the negative electrode; and an electrolyte.

According to a twenty-first embodiment, in the twentieth embodiment, a ratio (El/S) of a total weight of the electrolyte to a total weight of sulfur (S) in the positive electrode may be 3.5 g/g or less.

According to a twenty-second embodiment, in the twentieth or twenty-first embodiment, a 10-second power density of the lithium-sulfur battery may be 2.1 kW/kg or higher.

According to a twenty-third embodiment, in any one of the twentieth to twenty-second embodiments, the lithium-sulfur battery may have a discharge capacity of 1,000 mAh/gs or higher per weight of sulfur (S) in the positive electrode at 1.0 C discharge rate.

The lithium-sulfur battery according to a twenty-fourth embodiment comprises an electrode assembly comprising the positive electrode according to nineteenth embodiment, a negative electrode and a separator between the positive electrode and the negative electrode; and an electrolyte, wherein the particle size $D_{10}$ and the particle size $D_{90}$ may be values measured when a state of charge (SOC) of the lithium-sulfur battery is 70% to 100%.

In case that the porous carbon materials have large particle size, the pores in the porous carbon materials are bigger than necessary, so the cell capacity may be low.

Additionally, in case that the porous carbon materials have wide particle size distribution, the cell capacity may be low due to non-uniform reaction of sulfur-based materials loaded onto the porous carbon materials of non-uniform size.

According to the present disclosure, since the porous carbon material having small and uniform particle size distribution to increase the uniformity of reaction is used as a host for the sulfur-based material, it may be possible to achieve high cell capacity compared to carbon materials having large or non-uniform particle size.

For example, in one aspect of the present disclosure, during the entire discharge process, a lithium-sulfur battery having a 10-second power density of 2.1 kW/kg or higher can be achieved.

Additionally, in another aspect of the present disclosure, a lithium-sulfur battery with a discharge capacity of 1,000 mAh/g or higher at 1.0C discharge rate can be achieved.

DETAILED DESCRIPTION

Figure 1:
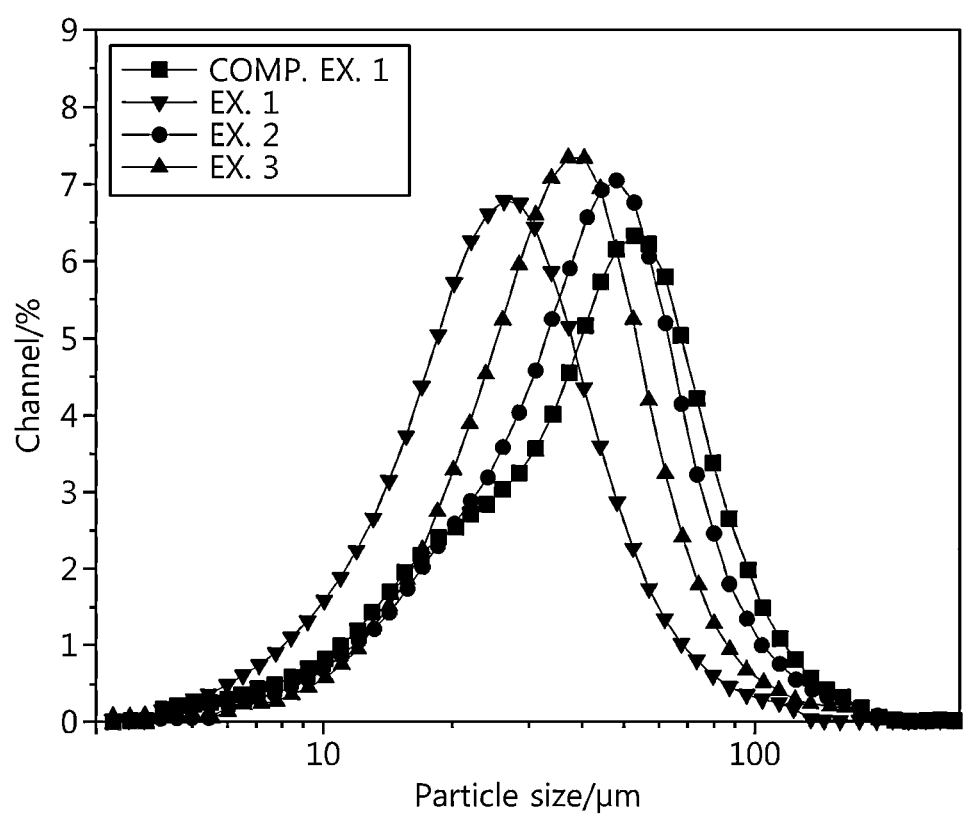
FIG. 1 is a graph showing the measurement results of particle size distribution of Comparative Example 1 and Examples 1 to 3.

Hereinafter, the present disclosure will be described in more detail.

It should be understood that the terms or words used in the specification and the appended claims should not be construed as limited to general and dictionary meanings, but rather interpreted based on the meanings and concepts corresponding to the technical aspect of the present disclosure on the basis of the principle that the inventor is allowed to define terms appropriately for the best explanation.

The term "comprise" or "include" when used in this specification, specifies the presence of stated elements, but does not preclude the presence or addition of one or more other elements, unless the context clearly indicates otherwise.

Additionally, the terms "about" and "substantially" as used herein are used in the sense of at, or nearly at, when given the manufacturing and material tolerances inherent in the stated circumstances, and are used to prevent the unscrupulous infringer from unfairly taking advantage of the present disclosure where exact or absolute figures are stated as an aid to understanding the present disclosure.

Throughout the specification, "A and/or B" refers to either A or B or both.

In the present disclosure, "specific surface area" is measured by the Brunauer, Emmett and Teller (BET) method, and specifically, it may be calculated from the adsorption amount of nitrogen gas under the liquid nitrogen temperature (77K) using BEL Japan's BELSORP-mini II.

The term "polysulfide" as used herein is the concept that covers "polysulfide ion ($S_x^{2-}$, $1 \leq x \leq 8$)" and "lithium polysulfide ($Li_2S_x$ or $LiS_x^-$, $1 \leq x \leq 8$)".

The term "composite" as used herein refers to a material with physically-chemically different phases and more effective functions, formed by combining two or more materials.

The term "porosity" as used herein refers to a fraction of voids in a structure over the total volume and is indicated in vol %, and may be used interchangeably with void fraction, degree of porosity or the like. The porosity can be measured according to the method specified in ISO 15901:2019.

In the present disclosure, "particle size $D_{10}$" refers to a particle size at 10% of cumulative volume particle size distribution of particles, "particle size $D_{50}$" refers to a particle size at 50% of cumulative volume particle size distribution of particles, and "particle size $D_{90}$" refers to a particle size at 90% of cumulative volume particle size distribution of particles.

Each of the particle size $D_{10}$, $D_{50}$ and $D_{90}$ may be measured using a laser diffraction method. For example, each of the particle size $D_{10}$, $D_{50}$ and $D_{90}$ may be measured by dispersing a target particle powder in a dispersion medium, introducing into a commercially available laser diffraction particle size measurement apparatus (for example, Microtrac MT 3000), irradiating ultrasound of about 28 kHz with an output of 60 W to acquire a cumulative volume particle size distribution graph, and determining the particle size corresponding to each of 10%, 50% and 90% of the cumulative volume distribution. That is, for example, the particle size $D_{50}$ represents the median value or median diameter in the particle size distribution graph, and it indicates the particle size at the 50% point on the cumulative distribution. Diameter represents the size of particles and particle diameter refers to the longest length within a particle.

The present disclosure relates to a positive electrode active material for an electrochemical device, a positive electrode comprising the same and a secondary battery comprising the positive electrode. The secondary battery may be a lithium ion secondary battery. In particular, the positive electrode active material according to the present disclosure comprises a sulfur-carbon composite, and the lithium ion secondary battery may be a lithium-sulfur secondary battery.

According to an aspect of the present disclosure, the positive electrode active material comprises the sulfur-carbon composite, and the sulfur-carbon composite comprises a porous carbon material; and a sulfur-based material loaded onto all or at least a portion of an inside of pores and a surface of the porous carbon material. The present disclosure is characterized in that the porous carbon material has a specific range of particle sizes.

Specifically, the positive electrode active material according to the present disclosure comprises the sulfur-carbon composite, the sulfur-carbon composite comprises the porous carbon material and the sulfur-based material, and the sulfur-based material is loaded and/or coated on all or at least a portion of the inside of the pores and a surface of the porous carbon material.

In the present disclosure, the porous carbon material is characterized in that the sum of the particle size $D_{10}$ and the particle size $D_{90}$ is 60 μm or less, or the broadness factor (BF) satisfying Equation 1 is 7 or less:

Broadness factor ($BF$)=(particle size $D_{90}$ of the porous carbon material)/(particle size $D_{10}$ of the porous carbon material). [Equation 1]

In another embodiment of the present disclosure, the porous carbon material may be characterized in that the sum of the particle size $D_{10}$ and the particle size $D_{90}$ is 60 μm or less, and the broadness factor (BF) is 7 or less.

In the present disclosure, the porous carbon material has a smaller particle size $D_{10}$ than the particle size $D_{90}$. In this instance, the smaller ratio of particle size distribution of the particle size $D_{90}$ to the particle size $D_{10}$, the more uniform particle size. The present disclosure may comprise the porous carbon material having the BF of 7 or less for uniform electrochemical reactivity of the active material, but the mechanism of the present disclosure is not limited thereto. The BF of the porous carbon material can, for example, range from more than 1 and 7 or less, more than 1 and 6 or less, from 2 to 6, from 3 to 6, from 4 to 7, from 4 to 6, or from 5.3 to 5.6.

As described above, in case that the porous carbon material has large particle size or has small particle size but wide particle size distribution, in other words, in case that the porous carbon material has non-uniform particle size, the cell capacity may decrease due to non-uniform reaction of the sulfur-based material loaded onto the porous carbon material. In this circumstance, the present disclosure uses the porous carbon material having small particle size, and more specifically, small particle size and small particle size distribution. That is, the present disclosure is characterized by comprising the porous carbon material having small particle size to improve the cell capacity. Furthermore, the present disclosure may be characterized by comprising the porous carbon material having small particle size and uniform particle size distribution to improve the cell capacity.

The broadness factor (BF) value can be measured with respect to the porous carbon material before being produced to a sulfur-carbon composite containing sulfur material. In other words, the BF value can be measured based on the raw material before manufacturing the sulfur-carbon composite. Additionally, the BF value can also be measured in the final product state, such as in the positive electrode active material, the positive electrode, or a lithium-sulfur battery. For example, in the case of a lithium-sulfur battery in the state of charge (SOC) range of 70% to 100% or preferably at SOC 100%, the positive electrode can be obtained by disassembling the battery under inactive conditions. From the obtained positive electrode, the binder and sulfur material can be extracted and removed using the methods disclosed in the art, leaving behind the residual porous carbon material. The $D_{90}$ and $D_{10}$ can be measured according to the aforementioned methods for measuring particle sizes Dn (n=10, 50, or 90), and then, the $D_{90}/D_{10}$ ratio can then be calculated as the BF value.

In an embodiment of the present disclosure, the sum of particle size $D_{10}$ and particle size $D_{90}$ of the porous carbon material may be, 60 μm or less, for example, 10 μm to 60 μm, 20 μm to 55 μm, 30 μm to 55 μm, 35 μm to 55 μm, 40 μm to 55 μm, 45 μm to 55 μm, or 50 μm to 55 μm. For another example, the sum of the particle size $D_{10}$ and the particle size $D_{90}$ of the porous carbon material may be 50 μm to 52 μm, or 51 μm. When the sum of the particle size $D_{10}$ and the particle size $D_{90}$ is in the above-described range, the porous carbon material has small particle size, leading to uniform loading of the sulfur-based material per porous carbon material, thereby achieving uniform reactivity of the lithium-sulfur battery using the sulfur-carbon composite formed using the same.

In an embodiment of the present disclosure, the particle size $D_{50}$ of the porous carbon material may have, for example, a value of 100 μm or less, 70 μm or less, or 50 μm or less. Specifically, the particle size $D_{50}$ of the porous carbon material may be 1 to 100 μm, 5 to 90 μm, 10 to 80 μm, 15 to 70 μm, 20 to 60 μm, 10 to 50 μm, 15 to 40 μm, or 20 to 40 μm. When the particle size $D_{50}$ of the porous carbon material is in the above-described range, it may be possible to increase the tap density of the positive electrode using the same, thereby increasing the energy density of the battery, but the present disclosure is not limited thereto. For example, when the particle size of the porous carbon material is large, the battery capacity may decrease due to the large pore size of the particulate carbon material. Accordingly, another feature of the present disclosure lies in the design with small and uniform particle size distribution by controlling the particle size of the porous carbon material within the proper range. When the porous carbon material having small particle size and uniform particle size distribution is used as a host for the sulfur-based material, it may be possible to achieve uniform electrochemical performance and improved battery capacity compared to carbon materials having large particle size and non-uniform particle size distribution. The method for measuring the particle size $D_{50}$ is the same as described above.

In one embodiment of the present disclosure, the porous carbon material acts as a host to provide skeleton for uniform and stable immobilization of sulfur and increases low electrical conductivity of sulfur for smooth electrochemical reaction. The porous carbon material can be used without being specifically limited to certain types, as long as it meets the aforementioned particle size conditions.

In one embodiment of the present disclosure, the porous carbon material includes irregular pores within the interior (closed pores) and/or on the surface (open pores) of the particles. In this case, the average diameter of these pores can range from 1 to 200 nm, for example, and the porosity can be between 10 to 90 vol % of the total volume of the porous carbon material. The average diameter of these pores can be measured, for example, using methods such as gas adsorption-based BET measurement or mercury intrusion porosimetry as known in the art.

In an embodiment of the present disclosure, the BET specific surface area of the porous carbon material is not limited to a particular range, but may be, for example, 100 $m^2/g$ or more. The large specific surface area of the porous carbon material may lead to high loading of the sulfur-based material, thereby improving the electrochemical performance of the positive electrode and the lithium-sulfur battery using the same, but the present disclosure is not limited thereto. Since the carbon material as a sulfur host has large BET specific surface area and the proper particle size range, the sulfur-carbon composite according to the present disclosure has high sulfur loading, low irreversible capacity and high energy density. That is, the present disclosure may have a structure for improving the availability of sulfur in the electrochemical reaction but is not limited thereto.

In an embodiment of the present disclosure, the BET specific surface area of the porous carbon material may be, for example, 100 to 2,500 $m^2/g$, 150 to 2,000 $m^2/g$, 150 to 1,500 $m^2/g$, 150 to 1,000 $m^2/g$, 130 to 300 $m^2/g$, or 170 to 200 $m^2/g$, but is not limited thereto.

The BET specific surface area may be measured by the BET method and may represent a value measured by the commonly used methods for measuring the BET specific surface area. For example, the BET specific surface area may be a value calculated from the adsorption amount of nitrogen gas under the liquid nitrogen temperature (77K) using BEL Japan's BELSORP-max.

In an embodiment of the present disclosure, the form of the porous carbon material can be used without any specific limitation, including spherical, rod-like, granular, sheet-like, tubular, or bulk forms. The porous carbon material may comprise any carbon-based material having porous and conductive properties commonly used in the corresponding technical field. For example, the porous carbon material may comprise at least one selected from the group consisting of graphite; graphene; carbon black including DENKA black, acetylene black, Ketjenblack, channel black, furnace black, lamp black, thermal black; carbon nanotubes (CNT) including single-walled carbon nanotubes (SWCNT) and multi-walled carbon nanotubes (MWCNT); carbon fibers including graphite nanofibers (GNF), carbon nanofibers (CNF) and activated carbon fibers (ACF); graphite including natural graphite, artificial graphite and expandable graphite; carbon nanoribbon; carbon nanobelt, carbon nanorod and activated carbon.

In an embodiment of the present disclosure, the porous carbon material may comprise carbon nanotubes. The carbon nanotube is a tube made of carbons connected in hexagonal shape. According to an embodiment of the present disclosure, the carbon nanotubes may be single-walled carbon nanotubes (SWCNT), multi-walled carbon nanotubes (MWCNT) or a combination thereof according to the number of layers of carbon atoms (referred to as 'carbon walls') of which the carbon nanotubes are made. Here, the length of the respective carbon nanotube is not particularly limited.

In an embodiment of the present disclosure, the porous carbon material may comprise carbon nanotubes, specifically multi-walled carbon nanotubes to improve the sulfur loading, but the present disclosure is not limited thereto.

In another embodiment of the present disclosure, the carbon nanotubes may comprise two or more carbon nanotubes entangled in close contact with each other by agglomeration between them. Specifically, in an embodiment of the present disclosure, the carbon nanotubes may be provided in the form of a carbon nanotube dispersion in which single strands are dispersed in a dispersion medium, or a secondary structure formed by agglomeration of carbon nanotubes of primary structure.

In this aspect, when the porous carbon material comprises carbon nanotubes, the carbon nanotubes may comprise at least one of a bundled secondary structure or an entangled secondary structure.

The bundled secondary structure of the carbon nanotubes refers to an agglomerate of primary structures in the lengthwise direction of carbon nanotubes by bonds between carbons, each primary structure being a single strand of carbon nanotube, and may be referred to as bundled CNT.

In an embodiment of the present disclosure, the carbon nanotubes may comprise, for example, entangled multi-walled carbon nanotubes.

In an embodiment of the present disclosure, the porous carbon material may comprise, for example, carbon nanotubes having the BET specific surface area of 100 to 2,500 $m^2/g$, 100 to 400 $m^2/g$, or 150 to 350 $m^2/g$, or specifically 200 $m^2/g$, but is not limited thereto.

In an embodiment of the present disclosure, the graphene may be a carbon layer consisting of carbon, or may be graphene oxide, reduced graphene oxide or a mixture thereof depending on its shape, but the present disclosure is not limited thereto.

Meanwhile, in another embodiment of the present disclosure, the carbon material may be manufactured by carbonization of precursors of various carbon materials.

In one embodiment of the present disclosure, the porous carbon material may be prepared by a pre-treatment process including milling by a centrifugal mill and filtering using a sieve according to the particle size, so that the porous carbon material has the above-described particle size. For example, the pre-treatment process includes:

(1) a step of centrifugally milling a porous carbon material; and
(2) a step of filtering the centrifugally milled porous carbon material through a sieve, wherein a mesh size of the sieve is 2.8 to 4 times of a target particle size $D_{50}$ of the porous carbon material.

The method for manufacturing the porous carbon material of the present disclosure is, however, not limited thereto.

In one embodiment of the present disclosure, the particle size of the porous carbon material may be controlled to satisfy the aforementioned particle size conditions (1) (sum of particle size $D_{10}$ and particle size $D_{90}$ is 60 μm or less) and/or (2) (BF is 7 or less), based on the above-described pre-treatment method.

In another embodiment of the present disclosure, the porous carbon material can be produced by subjecting the porous carbon material as a raw material to centrifugal milling and filtering through a sieve having a mesh size relative to the desired particle size. In this case, to satisfy the particle size conditions (1) and/or (2), the mesh size of the sieve may be 2.8 to 4 times the particle size $D_{50}$ of the produced porous carbon material.

Conventionally, the porous carbon material has been pulverized using a ball mill, a blade, etc. in order to control the particle size of the porous carbon material. However, the conventional pulverization method has the problem that a porous carbon material with a large particle size and a porous carbon material with a small particle size exist together as the porous carbon material contacts with the ball or the blade randomly, resulting in a broad particle size distribution.

In one embodiment of the present disclosure, in the above-described pre-treatment method, the step (1) may be performed by utilizing a centrifugal mill including the sieve and a plurality of rotating teeth, and in the step (1), the porous carbon material is milled by contacting the plurality of rotating teeth in the centrifugal mill. The rotating teeth may have a linear velocity of 30 to 125 m/s. Preferably, the rotating teeth can have a linear velocity of 30 to 95 m/s. When the centrifugal milling speed in step (1) is within the aforementioned range, it can be advantageous in terms of finely and uniformly controlling the particle size of the porous carbon material while not increasing tap density.

The centrifugal mill, for example, may include 2 to 20, 4 to 18, 6 to 16, 8 to 14, 10 to 14, or 10 to 12 rotating teeth. Furthermore, in one embodiment of the present disclosure, each of the plurality of rotating teeth can have a shape of a triangular prism. The plurality of rotating teeth can be arranged to face the rotation axis of the centrifugal mill. Specifically, when viewed from the top of the centrifugal mill, the plurality of rotating teeth can be arranged such that an edge of each of the triangular prisms faces the center of the centrifugal mill.

In one embodiment of the present disclosure, the plurality of rotating teeth can be made of materials such as stainless steel, titanium, or stainless steel with protective coatings. However, this is not limited thereto.

The centrifugal milling may be performed at 6,000-23,000 rpm for the control of the particle size of the porous carbon material. Specifically, centrifugal milling can be performed using Retsch ZM 200 device at speeds ranging from 6,000 to 23,000 rpm, preferably at speeds of 6,000 to 18,000 rpm.

In one embodiment of the present disclosure, considering that the force applied can vary with the size of the centrifugal mill even at the same RPM, it's possible to adjust the RPM to achieve grinding at linear velocities between 30 and 125 m/s according to the formula below, taking into account the size of the centrifugal grinder:

Linear Velocity (m/s)=(*RPM*×Circumference)/60 seconds

In the formula above, 'Circumference' represents the distance traveled during one rotation of a rotating tooth. Specifically, when the radius at which one rotation tooth rotates is "r", the circumference represents a value of 2πr.

In the above-described pre-treatment method, the step (2) is a step in which the porous carbon material centrifugally milled in the step (1) is filtered through a sieve.

The sieve may be equipped on an outer rim of the centrifugal mill. Specifically, the sieve can be equipped to surround the plurality of rotating teeth within the centrifugal mill. In one embodiment of the present disclosure, the sieve can have a cylindrical shape and be arranged around the plurality of rotating teeth. For example, from the top view of the centrifugal mill, the shortest distance between the plurality of rotating teeth and the sieve can be 0.1 to 5 mm or 0.5 to 2 mm, or 1 mm. The sieve can include a mesh with trapezoidal and/or circular holes.

In one embodiment of the present disclosure, as the teeth rotate, the porous carbon material is milled by contacting the rotating teeth and the porous carbon material with controlled particle sizes can pass the sieve immediately while a centrifugal force is applied. Therefore, the issues of further reducing particle size and/or damaging the surface can be prevented. According to one aspect of the present disclosure, performing steps (1) and (2) simultaneously can achieve controlled particle diameter and obtain porous carbon material with a narrow particle size distribution.

In this manner, in one embodiment of the present disclosure, it may be advantageous for step (2) to be performed with centrifugal force applied to the porous carbon material.

In the step (2), the porous carbon material centrifugally milled in the step (1) is transferred to and filtered through a sieve. The steps (1) and (2) may be performed by a continuous process. That is to say, in the step (2), the porous carbon material centrifugally milled in the step (1) is not separately collected and added to the sieve. Specifically, the porous carbon material is centrifugally milled and the centrifugally milled porous carbon material may move to the sieve due to the applied centrifugal force. It is then filtered as it passes through the sieve if it has a particle size small enough to pass through the sieve. That is, the centrifugal milling in the step (1) and the filtration through the sieve in the step (2) may be performed at the same time. As the steps (1) and (2) are performed at the same time, processing time may be very short and very superior process efficiency may be achieved.

The particle size of the porous carbon material may be controlled by controlling the mesh size of the sieve used in the step (2). The mesh size of the sieve may be 2.8-4 times of the target particle size $D_{50}$ of the porous carbon material, i.e., the particle size $D_{50}$ of the porous carbon material filtered through the sieve in the step (2) (2.8≤mesh size/target $D_{50}$≤4). When the mesh size of the sieve is limited as described above, the desired $D_{50}$ particle size of the porous carbon material may be achieved and a porous carbon material with a narrow particle size distribution may be obtained.

In one embodiment of the present disclosure, the target particle size $D_{50}$ of the porous carbon material can be, for example, the particle size $D_{50}$ of the porous carbon material manufactured according to one aspect of the present disclosure. For example, it can range from 10 μm to 100 μm, 5 μm to 90 μm, 10 μm to 80 μm, 15 μm to 70 μm, 20 m to 60 μm, 10 μm to 50 μm, 15 μm to 40 μm, or 20 μm to 40 m. In the present disclosure, the sulfur-based material may include, without limitation, any material that may provide sulfur ($S_8$) as the active material of the lithium-sulfur battery. For example, the sulfur-based material comprises at least one of sulfur ($S_8$) or a sulfur compound.

In an embodiment of the present disclosure, the sulfur-based material may comprise at least one selected from the group consisting of inorganic sulfur ($S_8$), $Li_2S_n$ (n≥1), an organic sulfur compound including at least one of 2,5-dimercapto-1,3,4-thiadiazole or 1,3,5-trithiocyanuic acid; and a carbon-sulfur polymer (($C_2S_x)_n$, x is 2.5 to 50, n≥2).

In an embodiment of the present disclosure, the sulfur-based material may be included in the sulfur-carbon composite by physical adsorption with the porous carbon material, or chemical bond between sulfur (S) and carbon in the porous carbon material, such as covalent bond, Van der Waals bond. Specifically, the sulfur-based material may chemically bind to the surface of the porous carbon material to form a composite.

In an embodiment of the present disclosure, the sulfur-carbon composite preferably comprises sulfur (S) in an amount of 60 wt % or more and less than 100 wt %, or 70 wt % or more and less than 100 wt % based on 100 wt % of the sulfur-carbon composite. For example, the sulfur-carbon composite may preferably comprise sulfur (S) in an amount of 60 wt % to 99 wt %, 70 wt % to 99 wt %, 75 wt % to 90 wt %, 70 wt % to 85 wt %, 70 wt % to 80 wt %, or 70 wt % to 75 wt % based on 100 wt % of the sulfur-carbon composite.

In the sulfur-carbon composite according to the present disclosure, the sulfur-based material may be disposed on at least one of the inside of the pores and/or the surface of the porous carbon material, and in this instance, may be present in an area of less than 100% of the entire surface of the porous carbon material, preferably 1 to 95%, and more preferably 60 to 90%. When sulfur is present on the surface of the porous carbon material within the above-described range, it may be possible to obtain the maximum effect in terms of electron transport area and electrolyte wetting.

Specifically, when sulfur is impregnated onto the surface of the porous carbon material uniformly to a small thickness at the area of the above-described range, it may be possible to increase the electron transport contact area during charging-discharging. In case that sulfur is present in the area corresponding to 100% of the entire surface of the porous carbon material, the porous carbon material is completely covered with sulfur, resulting in poor electrolyte wetting and low contact with the conductive material included in the electrode, thereby failing to accept electrons and participate in reaction.

The sulfur-carbon composite may be formed by simply mixing the sulfur-based material with the porous carbon material, or coating or loading into a core-shell structure. The coating of the core-shell structure may comprise coating any one of the sulfur-based material and the porous carbon material on the other material, and for example, covering the porous carbon material surface with sulfur or vice versa. Additionally, the loading may comprise filling the sulfur-based material in the porous carbon material, especially the pores of the porous carbon material. The sulfur-carbon composite may be available in any form that satisfies the above-described content ratio of the sulfur and the porous carbon material, and the present disclosure is not limited thereto.

Subsequently, there is provided a method for manufacturing the sulfur-carbon composite. The method for manufacturing the sulfur-carbon composite according to the present disclosure is not limited to a particular one and may include any method commonly used in the corresponding technical field, and the sulfur-carbon composite may be manufactured by a composite manufacturing method including (S1) mixing the porous carbon material with the sulfur-based material, and (S2) forming a composite.

The step (S1) of mixing may be performed by a stirrer commonly used in the corresponding technical field to improve the mixing between the sulfur-based material and the porous carbon material. In this instance, the mixing time and speed may be selectively adjusted according to the amounts and conditions of the raw materials.

The step (S2) of forming the composite is not limited to a particular method in the present disclosure and may use any method commonly used in the corresponding technical field. The method commonly used in the corresponding technical field may include, for example, a dry process or a wet process, such as spray coating. For example, the sulfur and the carbon material may be mixed together, and the mixture may be milled by ball mill and placed in an oven of 120 to 160° C. for 20 minutes to 1 hour to uniformly coat the molten sulfur on the inside of the pores and a surface of the porous carbon material.

Since the sulfur-carbon composite manufactured through the above-described manufacturing method has large specific surface area, high sulfur loading and improved availability of sulfur, it may be possible to improve the electrochemical reactivity of sulfur and improve the accessibility and contact of the electrolyte solution, thereby improving the capacity and life characteristics of the lithium-sulfur battery.

Another aspect of the present disclosure provides a positive electrode formed using the sulfur-carbon composite.

The positive electrode according to another aspect of the present disclosure comprises a current collector; and a positive electrode active material layer on at least one surface of the current collector, wherein the positive electrode active material layer comprises the sulfur-carbon composite, and the sulfur-carbon composite comprises the porous carbon material and the sulfur-based material disposed on all or at least a portion of the inside of pores and a surface of the porous carbon material.

In this instance, the positive electrode active material layer is characterized by comprising the above-described positive electrode active material.

That is, the positive electrode comprises the sulfur-carbon composite comprising the porous carbon material, of which the sum of particle size $D_{10}$ and particle size $D_{90}$ is equal to or less than 60 μm and/or the broadness factor (BF) satisfying Equation 1 is 7 or less:

Broadness factor $(BF)$=(particle size $D_{90}$ of the porous carbon material)/(particle size $D_{10}$ of the porous carbon material). [Equation 1]

Additionally, in an embodiment of the present disclosure, the particle size $D_{50}$ of the porous carbon material may be, for example, 100 μm or less.

In an embodiment of the present disclosure, the positive electrode satisfies Equation 2:

$X_L/X_S \leq 15$ [Equation 2]

wherein $X_L$ is an average value of longest axis lengths in top five sulfur-carbon composites on an area basis in a top view image of the positive electrode active material layer, and wherein $X_S$ is an average value of longest axis lengths in bottom five sulfur-carbon composites on the area basis in the top view image of the positive electrode active material layer.

The positive electrode satisfying Equation 2 may have a small and/or uniform particle size of the sulfur-carbon composite included in the positive electrode active material layer. Further, the positive electrode satisfying Equation 2 may have advantageous effects in respect of an uniform reactivity of the lithium-sulfur battery using the same because of a small gap between sulfur-carbon composites in the positive electrode active material layer.

Specifically, according to an embodiment of the present disclosure, a value of $X_L X_S$ may be, for example, 15 or less, 10 or less, or 5 or less. Additionally, the value of $X_L/X_S$ may be 1 or more, 1.5 or more, 2 or more, 2.5 or more, 3 or more, or 3.5 or more within the upper limit of the range. For example, the value of $X_L/X_S$ may be from 1 to 15, from 1.5 to 10, from 2.0 to 5, from 2.5 to 5.0, from 3.0 to 5.0, from 3.0 to 4.0, or from 3.0 to 4.5. When the value of $X_L X_S$ is in the above-described range, there may be advantageous effects in respect of having a small gap between sulfur-carbon composites in the positive electrode active material layer and an electrochemical reaction uniformity in the positive electrode.

In the present disclosure, when a stack direction of the current collector and the positive electrode active material layer in the positive electrode can be defined as a 'vertical direction,' a surface of the positive electrode active material layer that contacts the current collector can be referred to as 'a lower surface of the positive electrode active material layer' or 'a bottom surface of the positive electrode active material layer,' and a surface opposite the contact surface with the current collector is referred to as 'an upper surface of the positive electrode active material layer' or 'a top surface of the positive electrode.' In one embodiment of the present disclosure, when manufacturing an electrode assembly including the above-described positive electrode, a negative electrode, and a separator, the upper surface of the positive electrode active material layer may refer to a surface in contact with the separator.

In the present disclosure, 'the top view image of the positive electrode active material layer' is an image used to determine the area and long axis length of the sulfur-carbon composites distributed on the surface and inside of the positive electrode active material layer, and can be, for example, an SEM image of the upper surface of the positive electrode active material layer.

According to an embodiment of the present disclosure, the gap between sulfur-carbon composites; grains surface; and grain boundaries; of the sulfur-carbon composite may be identified by a brightness difference in the top view image of the positive electrode active material layer.

In this instance, to measure the longest axis in the top five sulfur-carbon composites and the bottom five sulfur-carbon composites based on the area of the sulfur-carbon composite, the top view image of the positive electrode active material layer may be preferably, for example, an image with at least 400× magnification SEM image. For example, the top view image of the positive electrode active material layer may be an image with 400× magnification, 1,000× magnification, 2,000× magnification or 5,000× magnification.

In an embodiment of the present disclosure, the top five sulfur-carbon composites and the bottom five sulfur-carbon composites based on the area of the sulfur-carbon composite may be selected from the images with the same magnification, but in order to make it easy to measure the longest axis length in each sulfur-carbon composite, they may be selected from the images with different magnification.

For example, the top five sulfur-carbon composites based on the area of the sulfur-carbon composite may be selected in an SEM image with 400× magnification, and the bottom five sulfur-carbon composites may be selected in an SEM image with 1,000× magnification.

In an embodiment of the present disclosure, the top five sulfur-carbon composites and the bottom five sulfur-carbon composites may be selected in the entire area of the positive electrode active material layer, but in order to make it easy to measure, a partial area of the positive electrode active material layer can be selected, and the top five sulfur-carbon composites and the bottom five sulfur-carbon composites can be selected in the same partial area.

In one embodiment of the present invention, the top five sulfur-carbon composites and the bottom five sulfur-carbon composites, for example, may be selected within the same area of the positive electrode active material layer, or may be selected within different areas.

For example, the top five sulfur-carbon composites and the bottom five sulfur-carbon composites may be selected within an area of 50 μm×50 μm to an area of 1,000 μm×1,000 μm.

In one embodiment of the present invention, the top five sulfur-carbon composites may be selected within an area of 150 μm×150 μm to 1,000 μm×1,000 μm In one embodiment of the present invention, the bottom five sulfur-carbon composites may be selected within an area of 50 μm×50 μm to 100 μm×100 μm.

For example, the top five sulfur-carbon composites and the bottom five sulfur-carbon composites may be selected in an area of 200 μm×200 μm from the top view image of the positive electrode active material layer.

In this instance, as described above, when the top five sulfur-carbon composites and the bottom five sulfur-carbon composites are selected from the images with different magnification, i.e., the top five sulfur-carbon composites may be selected in an area of 200 μm×200 μm from the top view image of the positive electrode active material layer, and the bottom five sulfur-carbon composites may be selected in an area of 70 μm×70 μm present in the area of 200 μm×200 μm.

In an embodiment of the present disclosure, the sulfur-carbon composite area may be determined by the pixel area occupied by the sulfur-carbon composite in the top view image of the positive electrode active material layer. That is, the top five sulfur-carbon composites based on the sulfur-carbon composite area may refer to sulfur-carbon composites having the largest five pixel areas occupied by grains in the top view image of the positive electrode active material layer. Additionally, the bottom five sulfur-carbon composites based on the area of the sulfur-carbon composite may refer to sulfur-carbon composites having the smallest five pixel area occupied by grains in the top view image of the positive electrode active material layer.

In an embodiment of the present disclosure, the longest axis in the sulfur-carbon composite refers to a longest straight line in a sulfur-carbon composite in the top view image of the positive electrode active material layer.

In an embodiment of the present disclosure, the longest axis of the sulfur-carbon composite may pass through the center of mass of a sulfur-carbon composite, but when the sulfur-carbon composite is not spherical, oval or elliptical in shape in the top view image of the positive electrode active material layer, the longest axis may not pass through the center of mass of the sulfur-carbon composite. Accordingly, the longest axis in the sulfur-carbon composite is not limited to a line passing through the center of the sulfur-carbon composite.

In an embodiment of the present disclosure, the longest axis length in the sulfur-carbon composite may be determined by the longest distance between pixels at which the longest axis is located in the top view image of the positive electrode active material layer.

In Equation 2, $X_L$ is the average value of longest axis lengths of the top five sulfur-carbon composites on the area basis in the top view image of the positive electrode active material layer, and $X_S$ is the average value of longest axis lengths of the bottom five sulfur-carbon composites on the area basis in the top view image of the positive electrode active material layer.

In the present disclosure, the 'average value' refers to an arithmetic mean. Accordingly, $X_L$ may be measured by measuring the longest axis length of each of the top five sulfur-carbon composites on the area basis in the top view image of the positive electrode active material layer, and calculating an average. Additionally, $X_S$ may be measured by measuring the longest axis length of each of the bottom five sulfur-carbon composites on the area basis in the top view image of the positive electrode active material layer, and calculating an average.

In an embodiment of the present disclosure, a particle having the longest axis length of less than 1 μm may appear on the top view image of the positive electrode active material layer. In this instance, the particle having the longest axis length of less than 1 μm is not a sulfur-carbon composite in which sulfur is loaded on the surface and/or in the pores, and may represent a porous carbon material that has been broken during the manufacturing process of the positive electrode or impurities. Accordingly, to measure the $X_S$, in selecting the bottom five sulfur-carbon composites on the area basis in the top view image of the positive electrode active material layer, a particle having the longest axis length of less than 1 μm is excluded, and only a particle having the longest axis length of 1 μm or more is selected.

In an embodiment of the present disclosure, whether or not the positive electrode satisfies Equation 2 may be measured immediately after the manufacture of the positive electrode or after charge and discharge.

For example, immediately before the manufacture of the positive electrode, the top view image of the positive electrode active material layer may be obtained before activation, and $X_L$ and $X_S$ may be measured by the above-described method in the obtained upper surface view (top view image) to determine whether or not Equation 2 is satisfied.

Additionally, the lithium-sulfur battery assembled using the positive electrode may be disassembled to obtain the positive electrode, and $X_L$ and $X_S$ may be measured by the above-described method in the top view image of the positive electrode active material layer of the obtained positive electrode to determine whether or not Equation 2 is satisfied.

Specifically, when disassembling the lithium-sulfur battery to determine whether or not Equation 2 is satisfied, the lithium-sulfur battery may be disassembled in a charged state. Specifically, the lithium-sulfur battery in a charged state may be disassembled under an inert atmosphere to obtain the positive electrode, followed by extraction of an electrolyte impregnated in the obtained positive electrode using a proper solvent, washing and drying, and then the top view image of the positive electrode active material layer may be obtained, and determination may be made as to whether or not Equation 2 is satisfied.

In an embodiment of the present disclosure, the state of charge of the lithium-sulfur battery may be, for example, SOC 50% to 100%, 50% to 90%, 70% to 90% or specifically SOC 60% to 80%, but the present disclosure is not limited thereto. Additionally, the inert atmosphere may be, for example, an Ar atmosphere, but the present disclosure is not limited thereto.

In an embodiment of the present disclosure, the lithium-sulfur battery may suffer separation of the active material from the positive electrode active material layer by the external pressure due to the repeated charge and discharge, or deformation of the positive electrode by the repeated expansion and shrink of the positive electrode active material. Accordingly, when the positive electrode is obtained by disassembling the lithium-sulfur battery, it may be preferable to determine whether or not Equation 2 is satisfied from the lithium-sulfur battery having the capacity retention of 80% or more compared to the initial capacity (capacity immediately after the manufacture).

In one embodiment of the present disclosure, the positive electrode active material layer includes a plurality of sulfur-carbon composites, and the positive electrode may satisfy the following Equation 2-1.

$$X_L/X_A \leq 2, \qquad \text{[Formula 2-1]}$$

wherein, the $X_L$ is an average value of longest axis lengths in top five sulfur-carbon composites on an area basis in a top view image of the positive electrode active material layer, and the $X_A$ is an average value of longest axis lengths in all of the sulfur-carbon composites in a top view image of the positive electrode active material layer.

The method for measuring $X_L$ and $X_A$ uses the above-described method for measuring $X_L$ and $X_S$. At this time, the $X_A$ is calculated as the average value after measuring the length of the longest axis of all sulfur-carbon composites found in the top view of the positive electrode active material layer.

In one embodiment of the present disclosure, the positive electrode active material layer may have an average tortuosity of 1.7 or less. Specifically, the average tortuosity can be 1.6 or less, for instance, between 1.3 and 1.6.

In one embodiment of the present disclosure, the term "tortuosity" may represent the degree of curvature of transport pathways for ions within the positive electrode material layer. In other words, as the tortuosity decreases, the transport pathways for ions within the positive electrode material layer become shorter, thereby enhancing the electrochemical activity of the electrode and the battery including the electrode can exhibit particularly favorable effects for high-power characteristics.

In one embodiment of the present disclosure, the average tortuosity of the positive electrode active material layer can be measured using the following method. For example, first, obtain an image of a vertical cross-section following the stacking direction (top-bottom direction) of the current collector—the positive electrode active material layer from a target positive electrode. Randomly select a point on the surface of the current collector facing the positive electrode active material layer and measure the vertical distance (L) from that point to the end of the positive electrode active material layer in the direction perpendicular to the electrode surface. Next, measure the minimum distance (C) along the boundary between particles (sulfur-carbon composite) located between the selected random point and the end of the positive electrode active material layer. Calculate the tortuosity (C/L) using the measured values of L and C. Repeat the above steps by selecting at least 3 different points on the surface of the current collector and calculate the tortuosity (C/L) from these points, and then calculate the "average tortuosity" by averaging the obtained values of C/L.

That is, the tortuosity can be calculated by measuring the vertical distance (L) between a random point on a surface of the current collector and the end point of the positive electrode active material layer perpendicular to the electrode surface and measuring the minimum distance (C) along the curved boundary of particles (sulfur-carbon composite) between the two points. Then, the tortuosity can be calculated using the following equation:

Tortuosity=[Minimum Curved Distance (C)/Vertical Distance (L)]

In addition, the "average tortuosity" can be an average of the tortuosity measured from at least 3 different points on the surface of the current collector.

In one embodiment of the present disclosure, the vertical cross-section images of the positive electrode can be, for example, SEM images. For instance, in FIGS. 4B and 5B, there are SEM images illustrating the vertical distance (L) and the minimum curved distance (C) for evaluating the tortuosity of the positive electrode active material layer for the positive electrode using sulfur-carbon composite in Comparative Example 2 and Example 4, respectively, as mentioned in the present disclosure. While the SEM images mentioned are captured at a magnification of 1,000×, but the measurement method for tortuosity is not limited thereto.

In one embodiment of the present disclosure, in a top view of the positive active material layer, the average tortuosity in the horizontal and vertical directions may be 1.7 or less.

For example, in the top view of the positive active material layer, the value of [(tortuosity in the horizontal direction+tortuosity in the vertical direction)/2] may be 1.7 or less, specifically 1 or more and 1.7 or less.

At this time, the tortuosity in the horizontal direction and the tortuosity in the vertical direction may be calculated according to the equation of [Minimum Curved Distance (C)/Vertical Distance (L)] as described above.

In one embodiment of the present invention, the average tortuosity in the horizontal and vertical directions in the top view of the positive active material layer can be measured as follows. On the above-described top view of the positive electrode active material layer, two straight lines extending in the horizontal and vertical directions and dividing half of each other are drawn. Measure the straight line distance (L) of each straight line. After measuring the minimum distance (C) along the boundary line between particles (sulfur-carbon complex) located between each point, the C/L value is calculated, and the average tortuosity of the horizontal and vertical direction is calculated.

Figure 11A:
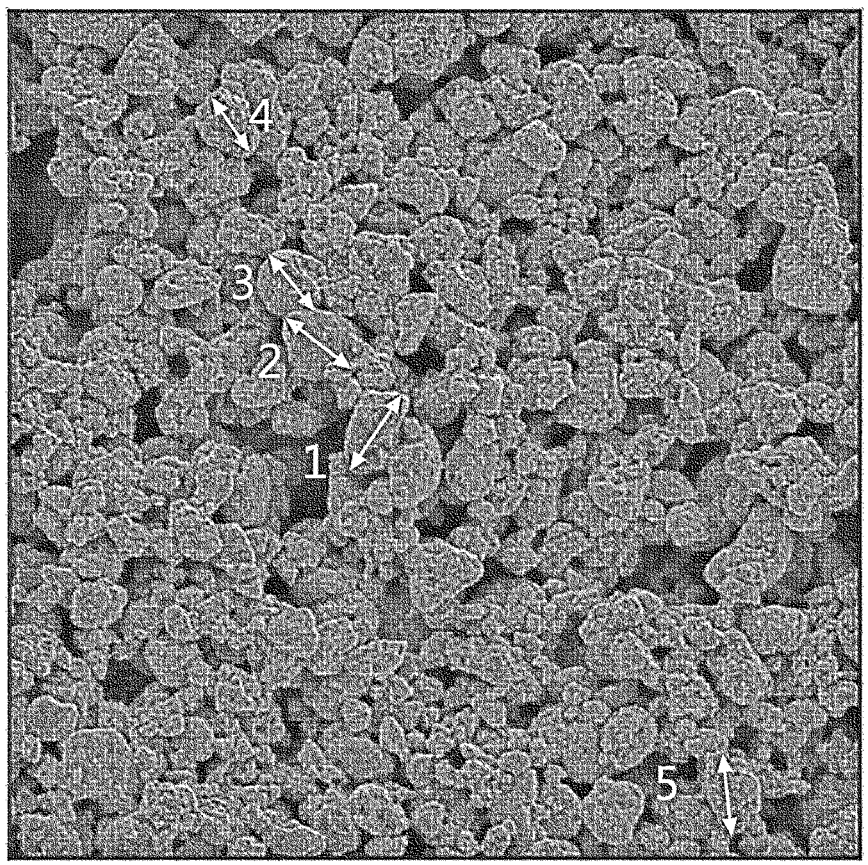
FIG. 11A is a scanning electron microscope (SEM) image at a magnification of 400 times of the top surface of the positive electrode active material layer of the positive electrode manufactured using the sulfur-carbon composite of Example 1 (200 μm×200 μm) showing the longest axis of the selected top five sulfur-carbon composites.
Figure 11B:
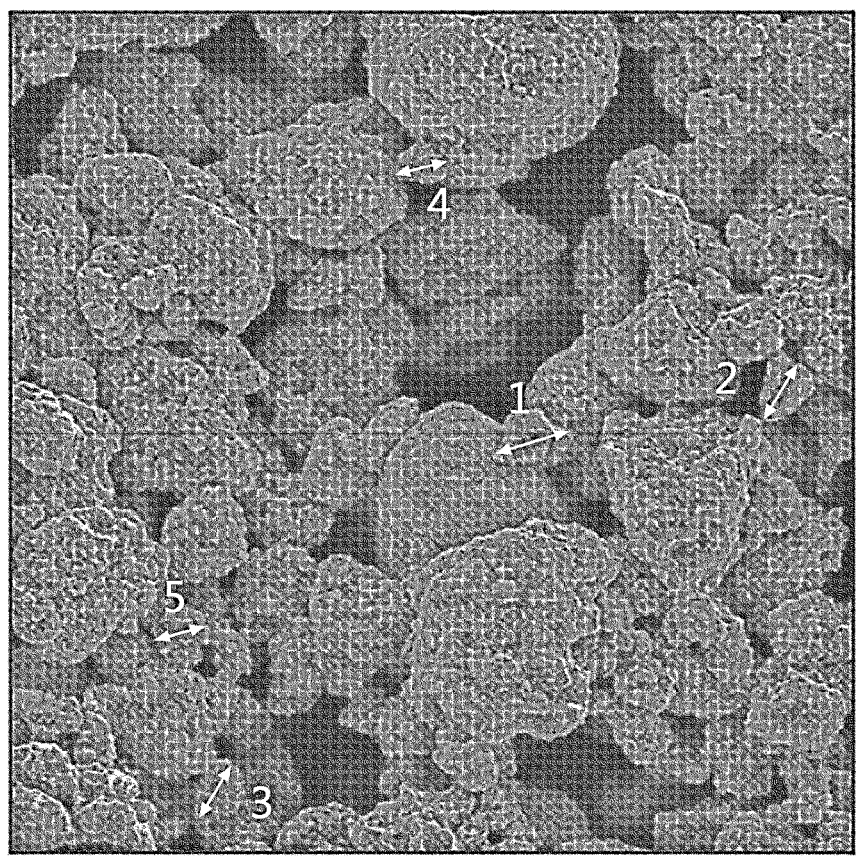
FIG. 11B is a scanning electron microscope (SEM) image at a magnification of 1,000 times of the top surface of the positive electrode active material layer of the positive electrode manufactured using the sulfur-carbon composite of Example 1 (70 μm×70 μm) showing the longest axis of the selected bottom five sulfur-carbon composites.
Figure 11C:
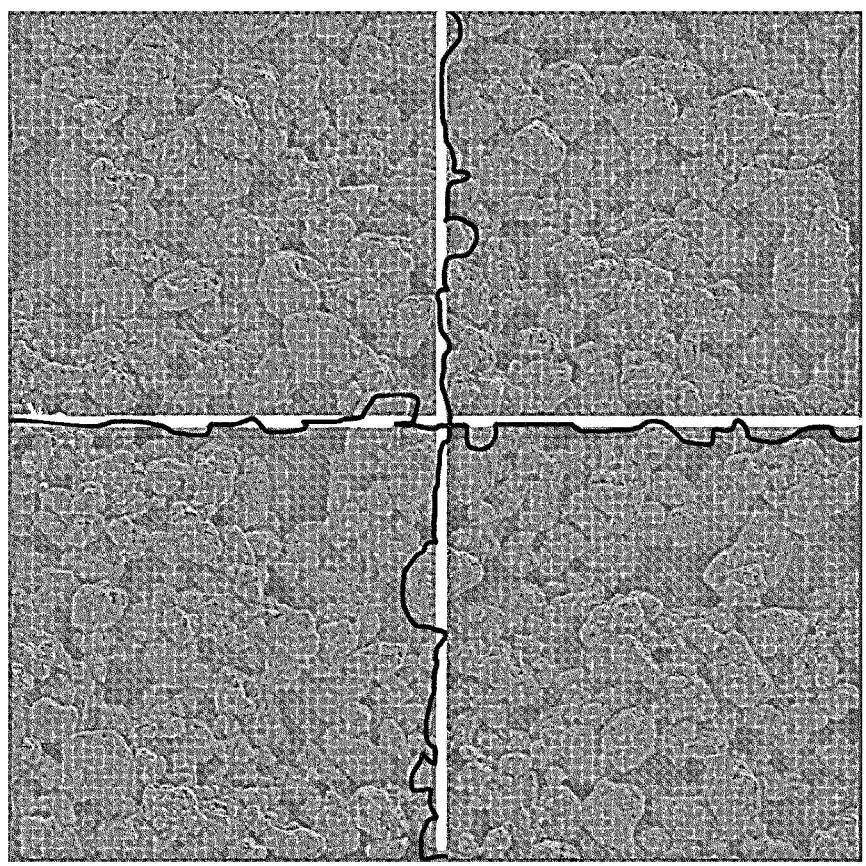
FIG. 11C is a scanning electron microscope (SEM) image at a magnification of 400 times of the top surface of the positive electrode active material layer of the positive electrode manufactured using the sulfur-carbon composite of Example 1 (200 μm×200 Mm) showing the shortest vertical lines and the shortest curved lines between sulfur-carbon composite in horizontal direction and vertical direction, respectively, to measure the average tortuosity in the upper positive electrode layer.
Figure 12A:
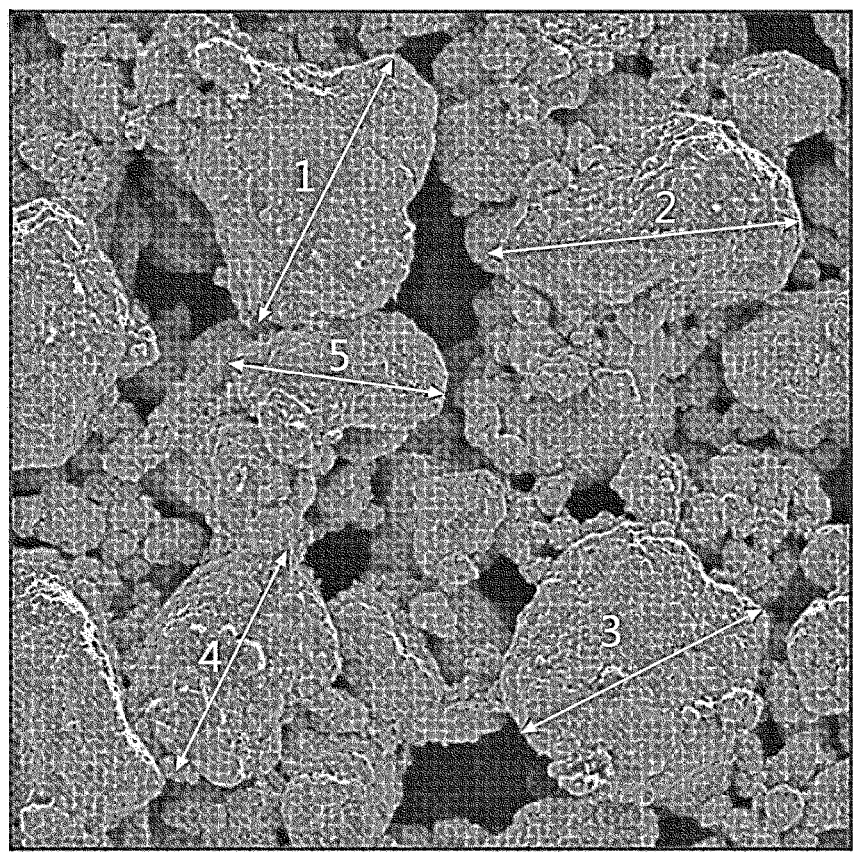
FIG. 12A is a scanning electron microscope (SEM) image at a magnification of 400 times of the top surface of the positive electrode active material layer of the positive electrode manufactured using the sulfur-carbon composite of Comparative Example 1 (200 μm×200 μm) showing the longest axis of the selected top five sulfur-carbon composites.
Figure 12B:
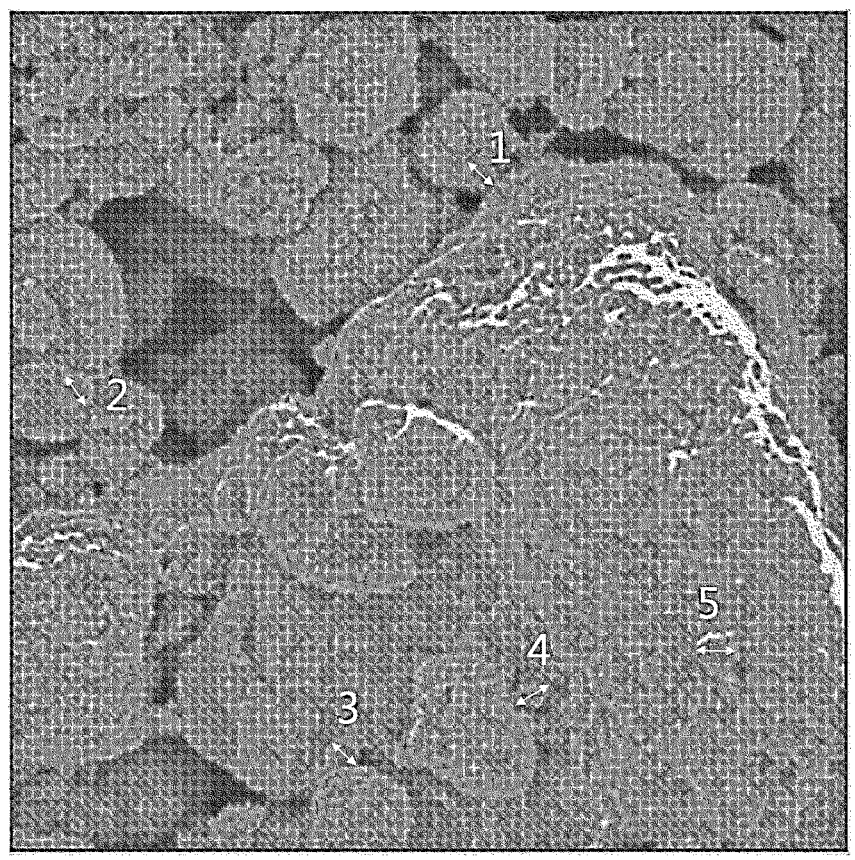
FIG. 12B is a scanning electron microscope (SEM) image at a magnification of 1,000 times of the top surface of the positive electrode active material layer of the positive electrode manufactured using the sulfur-carbon composite of Comparative Example 1 (70 μm×70 μm) showing the longest axis of the selected bottom five sulfur-carbon composites.
Figure 12C:
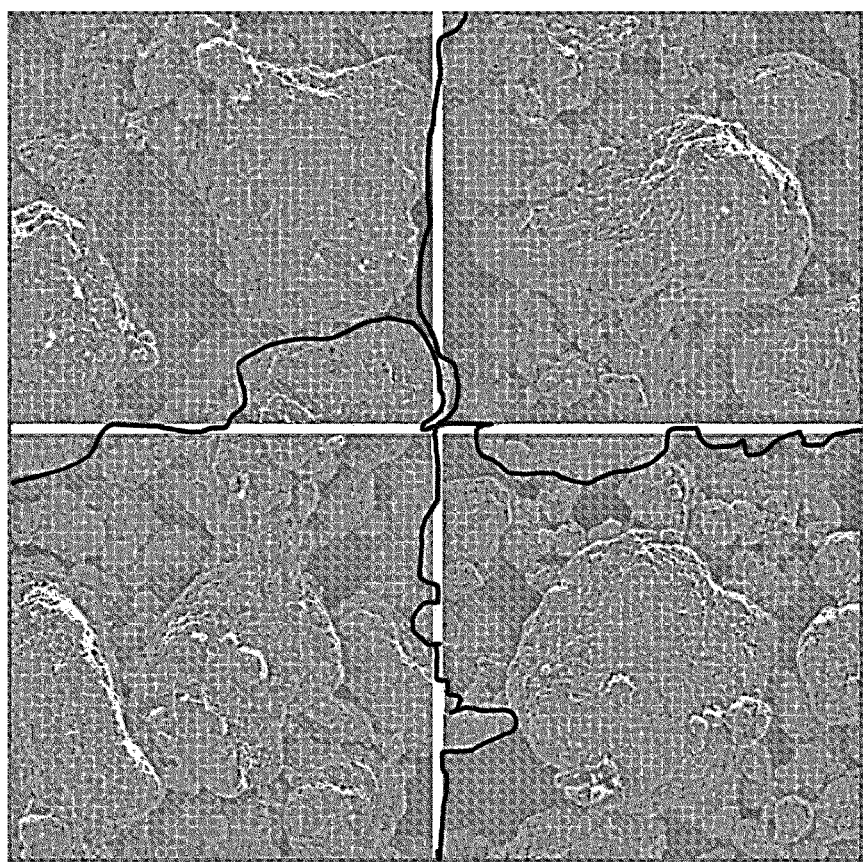
FIG. 12C is a scanning electron microscope (SEM) image at a magnification of 400 times of the top surface of the positive electrode active material layer of the positive electrode manufactured using the sulfur-carbon composite of Comparative Example 1 (200 μm×200 μm) showing the shortest vertical lines and the shortest curved lines between sulfur-carbon composite in horizontal direction and vertical direction, respectively, to measure the average tortuosity in the upper positive electrode layer.

For example, to evaluate the tortuosity of the top surface of the positive electrode active material layer for the positive electrode using the sulfur-carbon composite of Example 1 and Comparative Example 1 in the present specification, the SEM images showing the vertical distance and minimum curved distance are shown in FIG. 11C (Example 1) and FIG. 12C (Comparative Example 1), respectively.

In an embodiment of the present disclosure, along with the sulfur-carbon composite, the positive electrode active material layer may comprise a binder resin. Additionally, in addition to the positive electrode active material and the binder resin, the positive electrode active material layer may further comprise a conductive material as necessary. In this instance, in an embodiment of the present disclosure, the positive electrode active material layer may preferably comprise the positive electrode active material in an amount of 70 wt % or more, 85 wt % or more or 90 wt % or more based on 100 wt % of the positive electrode active material layer.

The positive electrode active material comprises the above-described sulfur-carbon composite. In an embodiment of the present disclosure, the sulfur (S) content in the sulfur-carbon composite may be preferably 60 wt % or more and less than 100 wt %, 65 wt % or more and less than 100 wt %, 70 wt % or more and less than 100 wt %, or 75 wt % or more and less than 100 wt % based on 100 wt % of the sulfur-carbon composite. When the sulfur (S) content in the sulfur-carbon composite is less than 60 wt %, it may be difficult to improve the energy density of the battery due to the insufficient electrode active material, but the present disclosure is not limited thereto. Additionally, in an embodiment of the present disclosure, the positive electrode active material layer may comprise the sulfur-carbon composite having the above-described feature in an amount of 50 wt % or more and less than 100 wt %, 60 wt % or more and less than 100 wt %, 70 wt % or more and less than 100 wt %, 90 wt % or more and less than 100 wt %, or 95 wt % or more and less than 100 wt % based on 100 wt % of the positive electrode active material. In an embodiment of the present disclosure, the positive electrode active material may consist of the sulfur-carbon composite.

In one embodiment of the present disclosure, the sulfur loading amount of the positive electrode may be, for example, 1.67 to 2.92 mg/cm$^2$ or 1.67 to 2.08 mg/cm$^2$. The sulfur loading serves as a factor for determining the loading level of the positive electrode and can be measured by the amount of sulfur present on the positive electrode per unit area (cm$^2$) of the electrode's surface.

Additionally, in addition to the sulfur-carbon composite, the positive electrode active material layer may further comprise a positive electrode active material commonly used in lithium secondary batteries. The commonly used positive electrode active material may include, for example, at least one of lithium transition metal oxide; lithium iron phosphate; lithium nickel-manganese-cobalt oxide; or oxide with partial substitution by other transition metals in lithium nickel-manganese-cobalt oxide, but is not limited thereto. Specifically, the positive electrode active material may include, for example, a layered compound such as lithium cobalt oxide ($LiCoO_2$), lithium nickel oxide ($LiNiO_2$) or a compound with substitution by one or more transition metals; lithium manganese oxide of formula $Li_{1+x}Mn_{2-x}O_4$ (where x is 0 to 0.33), $LiMnO_3$, $LiMn_2O_3$, $LiMnO_2$; lithium copper oxide ($Li_2CuO_2$); vanadium oxide such as $LiV_3O_8$, $LiV_3O_4$, $V_2O_5$, $Cu_2V_2O_7$; Ni site lithium nickel oxide represented by formula $LiNi_{1-x}M_xO_2$ (where M=Co, Mn, Al, Cu, Fe, Mg, B or Ga, x=0.01 to 0.3); lithium manganese composite oxide represented by formula $LiMn_{2-x}M_xO_2$ (where M=Co, Ni, Fe, Cr, Zn or Ta, x=0.01 to 0.1) or $Li_2Mn_3MO_8$ (where M=Fe, Co, Ni, Cu or Zn); lithium metal phosphate $LiMPO_4$ (where M=Fe, CO, Ni, or Mn); lithium nickel-manganese-cobalt oxide $Li_{1+x}(Ni_aCo_bMn_c)_{1-x}O_2$ (x=0~0.03, a=0.3 to 0.95, b=0.01 to 0.35, c=0.01 to 0.5, a+b+c=1); oxide $Li_a[Ni_bCo_cMn_dAl_e]_{1-f}M1_fO_2$ (M1 is at least one selected from the group consisting of Zr, B, W, Mg, Ce, Hf, Ta, La, Ti, Sr, Ba, F, P and S, 0.8≤a≤1.2, 0.5≤b≤0.99, 0<c<0.5, 0<d<0.5, 0.01≤e≤0.1, 0≤f≤0.1) partially substituted by aluminum in lithium nickel-manganese-cobalt oxide; oxide $Li_{1+x}(Ni_aCo_bMn_cM_d)_{1-x}O_2$ (x=0 to 0.03, a=0.3 to 0.95, b=0.01 to 0.35, c=0.01 to 0.5, d=0.001 to 0.03, a+b+c+d=1, M is any one selected from the group consisting of Fe, V, Cr, Ti, W, Ta, Mg and Mo) partially substituted by other transition metal in lithium nickel-manganese-cobalt oxide, a disulfide compound; and $Fe_2(MoO_4)_3$, but is not limited thereto.

Meanwhile, the positive electrode current collector may include various types of positive electrode current collectors used in the corresponding technical field. For example, the positive electrode current collector may include stainless steel, aluminum, nickel, titanium, sintered carbon or aluminum or stainless steel treated with carbon, nickel, titanium or silver on the surface. The positive electrode current collector may be typically 3 μm to 500 μm in thickness, and the positive electrode current collector may have microtexture on the surface to increase the adhesion strength of the positive electrode active material. The positive electrode current collector may come in various forms, for example, a film, a sheet, a foil, a net, a porous body, a foam and a nonwoven.

The binder resin may play a role in attaching the positive electrode active material particles to each other and improving the adhesion strength between the positive electrode active material and the positive electrode current collector, and specific examples may include at least one of polyvinylidenefluoride (PVDF), a vinylidene fluoride-hexafluoropropylene copolymer (PVDF-co-HFP), polyvinylalcohol, polyacrylonitrile, carboxymethyl cellulose (CMC), starch, hydroxypropylcellulose, regenerated cellulose, polyvinylpyrrolidone, polytetrafluoroethylene, polyethylene, polypropylene, ethylene-propylene-diene monomer rubber (EPDM rubber), sulfonated-EPDM, styrene butadiene rubber (SBR), fluoro rubber, or a variety of copolymers thereof. The binder resin may be included in an amount of 1 to 30 wt %, preferably 1 to 20 wt %, and more preferably 1 to 10 wt % based on the total weight of the positive electrode active material layer.

The conductive material may be used to provide conductive properties to the electrode, and may include, without limitation, any conductive material having the ability to conduct electrons without causing any chemical change in the corresponding battery. Specific examples may include at least one of graphite such as natural graphite or artificial graphite; a carbon-based material such as carbon black, acetylene black, Ketjenblack, channel black, furnace black, lamp black, thermal black, carbon fibers, carbon nanotubes; metal powder or metal fibers of copper, nickel, aluminum, silver; conductive whiskers of zinc oxide, potassium titanate; conductive metal oxide such as titanium oxide; or conductive polymer such as polyphenylene derivatives. When the conductive material is used, the conductive material may be typically included in an amount of 1 to 30 wt %, preferably 1 to 20 wt %, and more preferably 1 to 10 wt % based on the total weight of the positive electrode active material layer, but is not limited thereto.

The positive electrode may be manufactured by the method well known in the corresponding technical field.

For example, describing the method for manufacturing the positive electrode of the present disclosure in detail, first, the binder resin is dissolved in a solvent for preparing a slurry, and the conductive material is dispersed. The solvent for preparing the slurry may preferably include solvents that may uniformly disperse the positive electrode active material and the binder resin, and if necessary, the conductive material, and easily evaporate. Typically, acetonitrile, methanol, ethanol, tetrahydrofuran, water and isopropylalcohol may be used.

Subsequently, the positive electrode active material and optionally an additive are uniformly dispersed in the solvent in which the conductive material is dispersed to prepare a positive electrode slurry. The amount of the solvent, the positive electrode active material, or optionally, the additive included in slurry is insignificant in the present disclosure, and they may be included in a sufficient amount for the proper viscosity for the coating of the slurry.

The prepared slurry is coated on the current collector and vacuum dried to form the positive electrode. The slurry may be coated on the current collector to a proper thickness according to the viscosity of the slurry and desired thickness of the positive electrode.

The coating may be performed by methods commonly used in the corresponding technical field, but for example, may be performed by applying the positive electrode active material slurry over an upper surface of the positive electrode current collector and uniformly spreading using a doctor blade. Besides, the coating may be performed by die casting, comma coating, screen printing or the like.

The drying is not limited to a particular condition, but may be performed in a vacuum oven of 50 to 200° C. within 1 day.

According to another aspect of the present disclosure, there is provided a lithium-sulfur battery comprising the above-described positive electrode.

Specifically, the lithium-sulfur battery comprises an electrode assembly comprising a positive electrode, a negative electrode and a separator interposed between the positive electrode and the negative electrode; and an electrolyte, wherein the positive electrode comprises the above-described positive electrode active material.

For example, the electrode assembly may form a stack type or stack/folding structure including the negative electrode and the positive electrode stacked with the separator interposed between the negative electrode and the positive electrode, or a jelly-roll structure including the negative and positive electrodes and the separator rolled up. Furthermore, in the jelly-roll structure, an additional separator may be placed on the outer side to prevent the contact between the negative electrode and the positive electrode.

The negative electrode may comprise a negative electrode current collector; and a negative electrode active material layer on at least one surface of the negative electrode current collector, and the negative electrode active material layer may comprise a negative electrode active material, a conductive material and a binder.

Next, the negative electrode will be described in more detail.

The negative electrode may comprise a long sheet shaped negative electrode current collector and a negative electrode active material layer on one or two surfaces of the negative electrode current collector, and the negative electrode active material layer may comprise the negative electrode active material and the binder resin. Additionally, the negative electrode active material layer may further comprise the conductive material if necessary.

Specifically, the negative electrode may be manufactured by coating a negative electrode slurry prepared by dispersing the negative electrode active material, the conductive material and the binder in a solvent such as dimethyl sulfoxide (DMSO), isopropyl alcohol, N-methylpyrrolidone (NMP), acetone or water on one or two surfaces of the long sheet shaped negative electrode current collector, and removing the solvent from the negative electrode slurry through a drying process, and rolling. Meanwhile, the negative electrode comprising an uncoated portion may be manufactured by not coating the negative electrode slurry at part of the negative electrode current collector, for example, an end of the negative electrode current collector when coating the negative electrode slurry.

The negative electrode active material may include a material capable of reversible intercalation or deintercalation of lithium ($Li^+$), a material capable of reversibly forming a lithium containing compound by reaction with lithium ions, a lithium metal or a lithium alloy.

The material capable of reversible intercalation or deintercalation of lithium ions may include, for example, crystalline carbon, amorphous carbon or a mixture thereof, and specifically, artificial graphite, natural graphite, graphitizable carbon fibers, amorphous carbon, soft carbon and hard carbon, but is not limited thereto.

The material capable of reversibly forming the lithium containing compound by reaction with the lithium ions may be, for example, tin oxide, titanium nitrate or a silicon-based compound.

The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al) and tin (Sn).

Preferably, the negative electrode active material may be a lithium metal, and specifically, may be in the form of a lithium metal foil or lithium metal powder.

The silicon-based compound may be Si, Si-Me alloy (where Me is at least one selected from the group consisting of Al, Sn, Mg, Cu, Fe, Pb, Zn, Mn, Cr, Ti, and Ni), $SiO_y$ (where $0<y<2$), Si—C composite or a combination thereof, and preferably $SiO_y$ (where $0<y<2$). Since the silicon-based compound has high theoretical capacity, when the silicon-based compound is included as the negative electrode active material, it may be possible to improve capacity characteristics.

The negative electrode current collector may include negative electrode current collectors commonly used in the corresponding technical field, and may include, for example, copper, stainless steel, aluminum, nickel, titanium, sintered carbon, copper or stainless steel treated with carbon, nickel, titanium or silver on the surface, and an aluminum-cadmium alloy. The negative electrode current collector may be typically 3 to 500 µm in thickness, and in the same way as the positive electrode current collector, may have microtexture on the surface to enhance the bonding strength of the negative electrode active material. For example, the negative electrode current collector may come in various forms, for example, a film, a sheet, a foil, a net, a porous body, a foam and a nonwoven.

The binder resin may play a role in attaching the negative electrode active material particles to each other and improving the adhesion strength between the negative electrode active material and the negative electrode current collector. Specific examples may include at least one of polyvinylidene fluoride (PVDF), a vinylidene fluoride-hexafluoropropylene copolymer (PVDF-co-HFP), polyvinylalcohol, polyacrylonitrile, carboxymethylcellulose (CMC), starch, hydroxypropylcellulose, regenerated cellulose, polyvinylpyrrolidone, polytetrafluoroethylene, polyethylene, polypropylene, ethylene-propylene-diene monomer rubber (EPDM rubber), sulfonated-EPDM, styrene-butadiene rubber (SBR), fluoro rubber, or a variety of copolymers thereof. The binder may be included in an amount of 1 to 30 wt %, preferably 1 to 20 wt %, and more preferably 1 to 10 wt % based on the total weight of the negative electrode active material layer.

The conductive material included if necessary may be used to provide conductive properties to the negative electrode, and may include, without limitation, any conductive material having the ability to conduct electrons without causing any chemical change in the corresponding battery. Specific examples may include at least one of graphite such as natural graphite or artificial graphite; a carbon-based material such as carbon black, acetylene black, Ketjenblack, channel black, furnace black, lamp black, thermal black, carbon fibers, carbon nanotubes; metal powder or metal fibers of copper, nickel, aluminum, silver; conductive whiskers of zinc oxide, potassium titanate; conductive metal oxide such as titanium oxide; or conductive polymer such as polyphenylene derivatives. When the conductive material is used, the conductive material may be typically included in an amount of 1 to 30 wt %, preferably 1 to 20 wt %, and more preferably 1 to 10 wt % based on the total weight of the negative electrode active material layer.

The separator is disposed between the negative electrode and the positive electrode in the electrode assembly. The separator may separate the negative electrode from the positive electrode and provide movement channels of lithium ions, and may include, without limitation, any type of separator commonly used in lithium secondary batteries. Specifically, the separator may include a porous polymer film, for example, a porous polymer film made of a polyolefin-based polymer such as an ethylene homopolymer, a propylene homopolymer, an ethylene/butene copolymer, an ethylene/hexene copolymer and an ethylene/methacrylate copolymer or a stack structure of two or more of them. Additionally, commonly used porous nonwoven fabrics, for example, nonwoven fabrics made of high melting point glass fibers, polyethyleneterephthalate fibers may be used. Additionally, coated separators comprising ceramics or polymer may be used to ensure heat resistance or mechanical strength.

Another aspect of the present disclosure relates to an electrochemical device comprising the electrode assembly. The electrochemical device may comprise a battery case accommodating the electrode assembly and the electrolyte, and the battery case may include, without limitation, any appropriate type of battery case commonly used in the corresponding technical field, for example, a pouch type or a metal can type.

The electrolyte used in the present disclosure may include any type of electrolyte available in lithium secondary batteries, for example, an organic liquid electrolyte, an inorganic liquid electrolyte, a solid polymer electrolyte, a gel polymer electrolyte, a solid inorganic electrolyte and a molten inorganic electrolyte, but is not limited thereto.

Specifically, the electrolyte may comprise an organic solvent and a lithium salt.

The organic solvent may include, without limitation, any type of organic solvent that may act as a medium for the movement of ions involved in the electrochemical reaction of the battery. Specifically, the organic solvent may include an ester-based solvent such as methyl acetate, ethyl acetate, γ-butyrolactone, ε-caprolactone; an ether-based solvent such as dibutyl ether or tetrahydrofuran; a ketone-based solvent such as cyclohexanone; an aromatic hydrocarbon-based solvent such as benzene, fluorobenzene; a carbonate-based solvent such as dimethylcarbonate (DMC), diethylcarbonate (DEC), methylethylcarbonate (MEC), ethylmethylcarbonate (EMC), ethylene carbonate (EC), propylene carbonate (PC); an alcohol-based solvent such as ethylalcohol, isopropyl alcohol; nitriles of R—CN (R is C2-C20 straight-chain, branched-chain or cyclic hydrocarbon, and may comprise an exocyclic double bond or ether bond); amides such as dimethylformamide; dioxolanes such as 1,3-dioxolane; or sulfolanes.

Meanwhile, in an embodiment of the present disclosure, it is desirable to comprise a heterocylic compound comprising an oxygen atom or a sulfur atom to form a polymer protective layer in order to suppress the production of lithium dendrite, and prevent electrolyte solution decomposition and side reaction on the lithium-based metal surface. The heterocylic compound may be 3 to 15 membered, preferably 3 to 7 membered, and more preferably 5 to 6 membered heterocylic compound.

The heterocylic compound may be a substituted or unsubstituted heterocylic compound with at least one selected from the group consisting of C1-C4 alkyl group, a C3-C8 cyclic alkyl group, a C6-C10 aryl group, a halogen group, a nitro group (—$NO_2$), an amine group (—$NH_2$) and a sulfonyl group (—$SO_2$); or a multi-cyclic compound of the heterocylic compound with at least one selected from the group consisting of a C3-C8 cyclic alkyl group and C6-C10 aryl group.

When the heterocylic compound is a heterocylic compound substituted by C1-C4 alkyl group, radicals are stabilized, and preferably, it may be possible to suppress side reaction between the additive and the electrolyte solution. Additionally, when the heterocylic compound is a heterocylic compound substituted by a halogen group or a nitro group, preferably, it may be possible to form a functional protective layer on the lithium-based metal surface. The functional protective layer may be a stable and compact protective layer, and may allow uniform deposition of the lithium-based metal and suppress side reaction between polysulfide and the lithium-based metal.

Specifically, the heterocylic compound may comprise, for example, at least one selected from the group consisting of furan, 2-methylfuran, 3-methylfuran, 2-ethylfuran, 2-propylfuran, 2-butylfuran, 2,3-dimethylfuran, 2,4-dimethylfuran, 2,5-dimethylfuran, pyran, 2-methylpyran, 3-methylpyran, 4-methylpyran, benzofuran, 2-(2-nitrovinyl)furan, thiophene, 2-methylthiophene, 2-ethylthiphene, 2-propylthiophene, 2-butylthiophene, 2,3-dimethylthiophene, 2,4-dimethylthiophene and 2,5-dimethylthiophene, and preferably at least one selected from the group consisting of 2-methylfuran and 2-methylthiophene.

Meanwhile, in an embodiment of the present disclosure, a nonaqueous solvent of the electrolyte solution may comprise an ether-based solvent to improve charge/discharge performance of the battery. As the nonaqueous solvent, the ether-based solvent may include at least one of cyclic ether (for example, 1,3-dioxolane or tetrahydrofuran, tetrohydropyran, etc.), a linear ether compound (for example, 1,2 dimethoxyethane, etc.) or low viscosity fluorinated ether (for example, 1H,1H,2'H,3H-decafluorodipropyl ether, difluoromethyl 2,2,2-trifluoroethyl ether, 1,2,2,2-tetrafluoroethyl trifluoromethyl ether, 1,1,2,3,3,3-hexafluoropropyl difluoromethyl ether, 1H,1H,2'H,3H-decafluorodipropyl ether, pentafluoroethyl 2,2,2-trifluoroethyl ether, 1H,1H,2'H-perfluorodipropyl ether).

The lithium salt may include, without limitation, any compound that may provide lithium ions used in lithium secondary batteries. Specifically, the lithium salt may include $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI or $LiB(C_2O_4)_2$. The concentration of the lithium salt may be in a range between 0.1 and 5.0M, and preferably 0.1 and 3.0M. When the concentration of the lithium salt is included in the above-described range, the electrolyte may have proper conductivity and viscosity and exhibit the outstanding electrolyte performance, thereby effectively transporting lithium ions.

In addition to the above-described constituent substances of the electrolyte, the electrolyte may further comprise an additive to improve the life characteristics of the battery, prevent the capacity fading of the battery and improve the discharge capacity of the battery. For example, the additive may at least one of $LiNO_3$, a haloalkylene carbonate-based compound such as difluoro ethylene carbonate, pyridine, triethylphosphite, triethanolamine, cyclic ether, ethylene diamine, n-glyme, hexamethylphosphoric triamide, nitrobenzene derivatives, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, but is not limited thereto. The additive may be included in an amount of 0.1 to 10 wt %, and preferably 0.1 to 5 wt % based on the total weight of the electrolyte.

Meanwhile, in an embodiment of the present disclosure, in the lithium-sulfur battery of the present disclosure, a ratio (El/S) of the total weight of the electrolyte to the total weight of sulfur (S) in the positive electrode may be preferably, for example, 3.5 g/g or less, for example, 3.3 g/g or less or 3.2 g/g or less. Additionally, in the lithium-sulfur battery, the ratio (El/S) of the total weight of the electrolyte to the total weight of sulfur (S) in the positive electrode may be 3.0 to 3.5 g/g, and for example, 3.1 to 3.2 g/g.

Using the sulfur-carbon composite according to the present disclosure, the lithium-sulfur battery may have the above-described range of El/S ratios, thereby improving energy density. However, the lithium-sulfur battery using the sulfur-carbon composite may have higher El/S ratios than the above-described range, and the present disclosure is not limited thereto.

The lithium-sulfur battery is not limited to a particular shape and may come in various shapes, for example, cylindrical-types, pouch-types, stack-types or coin-types and the present disclosure is not limited thereto.

Additionally, the present disclosure provides a battery module including the lithium-sulfur battery as a unit battery. The battery module may be used as a source of power for medium- and large-scale devices requiring high temperature stability, long cycle life characteristics and high capacity characteristics.

In one embodiment of the present disclosure, the lithium-sulfur battery using the aforementioned positive electrode material or the positive electrode including thereof may maintain a high power density during discharge. Specifically, the battery can exhibit the effect of maintaining a 10-second power density of 2.1 kW/kg or more during discharge.

In one embodiment of the present disclosure, the 10-second power density can be calculated according to Equation 3 after passing a current through the lithium-sulfur battery for 10 seconds. However, this measurement method is not limited thereto.

Power Density(kW/kg)=[($V$ min)×(Max $C$-rate)× (Discharge Capacity)]/[Battery Weight]  [Equation 3]

According to an embodiment of the present disclosure, the lithium-sulfur battery using the above-described positive electrode active material or the above-described positive electrode, may have the discharge capacity per weight of sulfur (S) of 1,000 mAh/gs or more, but the present disclosure is not limited thereto.

Examples of the medium- and large-scale device may include power tools; electric cars including electric vehicles (EV), hybrid electric vehicles (HEV), plug-in hybrid electric vehicles (PHEV); electric two-wheeled vehicles including E-bikes, E-scooters; electric golf carts; energy storage systems that work using power produced by an electric motor, but is not limited thereto.

Hereinafter, examples are presented to help understanding of the present disclosure, but the following examples are provided to describe the present disclosure by way of example and it is obvious to those skilled in the art that various modifications and changes may be made without departing from the scope and technical aspect of the present disclosure, and such modifications and changes fall within the scope of the appended claims.

[Manufacture of Sulfur-Carbon Composite]

Preparation Example 1: Preparing Porous Carbon Material

Carbon nanotubes (CNT) (Entangled multi-walled carbon nanotube, BET specific surface area 200 m$^2$/g) were introduced to a centrifugal mill (RETSCH ZM200) equipped with a sieve and centrifugally milled. The carbon nanotubes were milled while centrifugal force was applied, and the milled carbon nanotubes were filtered through the sieve to control the particle size. The mesh size of the sieve and the rotational speed of the centrifugal mill were adjusted to obtain carbon nanotubes with the desired target particle size $D_{50}$. The obtained particle size conditions of the porous carbon material are listed in TABLE 1.

Preparation Example 2: Preparing Porous Carbon Material

Carbon nanotubes (CNT) (Entangled multi-wall carbon nanotube, BET specific surface area 200 m$^2$/g) were ground by jet milling, resulting in the milled carbon nanotubes.

Manufacturing Sulfur-Carbon Composite (Examples 1 to 4 and Comparative Examples 1 to 2)

The carbon nanotubes obtained from Preparation Example 1 or Preparation Example 2 was used as a porous carbon material, and mixed with sulfur (S$_8$) in the weight ratios specified in TABLE 1 and TABLE 2, and then ball-milled and heated in an oven at 155° C. for 30 minutes to produce a sulfur-carbon composite.

TABLE 1

| Sulfur-carbon composite | Porous carbon material | | | | Sulfur (S) amount (relative to 100 wt % of Sulfur and porous carbon material) |
|---|---|---|---|---|---|
| | Preparation method | $D_{10}$ + $D_{90}$ | BF ($D_{90}/D_{10}$) | Particle size $D_{50}$ | |
| Example 1 | Preparation Example 1, Mesh size 80 μm RPM 18,000 Linear velocity 94.2 m/s | 51 μm | 5.49 | 24 μm | 75 wt % |
| Example 2 | Preparation Example 1, Mesh size 120 μm RPM 10,000 Linear velocity 31.4 m/s | 86 μm | 5.55 | 35 μm | 75 wt % |
| Example 3 | Preparation Example 1, Mesh size 80 μm RPM 14,000 Linear velocity 73.3 m/s | 70 μm | 5.38 | 29 μm | 75 wt % |
| Comparative Example 1 | Preparation Example 2 | 128 μm | 11.05 | 38 μm | 75 wt % |

TABLE 2

| Sulfur-carbon composite | Porous carbon material | | | | Sulfur (S) amount (Relative to 100 wt % of Sulfur and porous carbon material) |
| --- | --- | --- | --- | --- | --- |
| | Preparation method | $D_{10} + D_{90}$ | BF ($D_{90}/D_{10}$) | Particle size $D_{50}$ | |
| Example 4 | Preparation Example 1, Mesh size 80 μm RPM 18,000 Linear velocity 94.2 m/s | 90 μm | 5.42 | 38 μm | 70 wt % |
| Comparative Example 2 | Preparation Example 2 | 128 μm | 10.68 | 38 μm | 70 wt % |

[Shape of Porous Carbon Material and Measurement of Particle Size]

The particle size distribution of the obtained porous carbon material was measured by dry method using a particle size analyzer (Model: Bluewave, Manufacturer: Microtrac) to determine the $D_{10}$, $D_{50}$, and $D_{90}$ particle sizes. In cases where the porous carbon material was agglomerated due to secondary particle formation, the primary particle size was observed and measured using a scanning electron microscope (SEM, Model: JEOL).

The BF was calculated as $D_{90}/D_{10}$. The particle size distribution measurement results for the porous carbon material used in Examples 1 to 3 and Comparative Example 1 are shown in FIG. 1.

Figure 2:
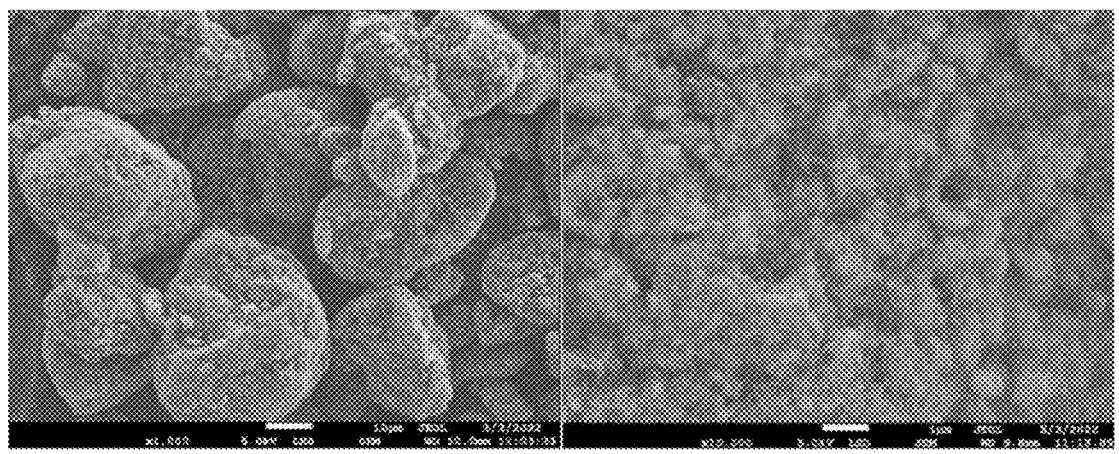
FIG. 2 is a scanning electron microscopy (SEM) image of a porous carbon material used to manufacture a sulfur-carbon composite of Example 4. The left image is at a magnification of 1,000 times, and the right image is at a magnification of 10,000 times.
Figure 3:
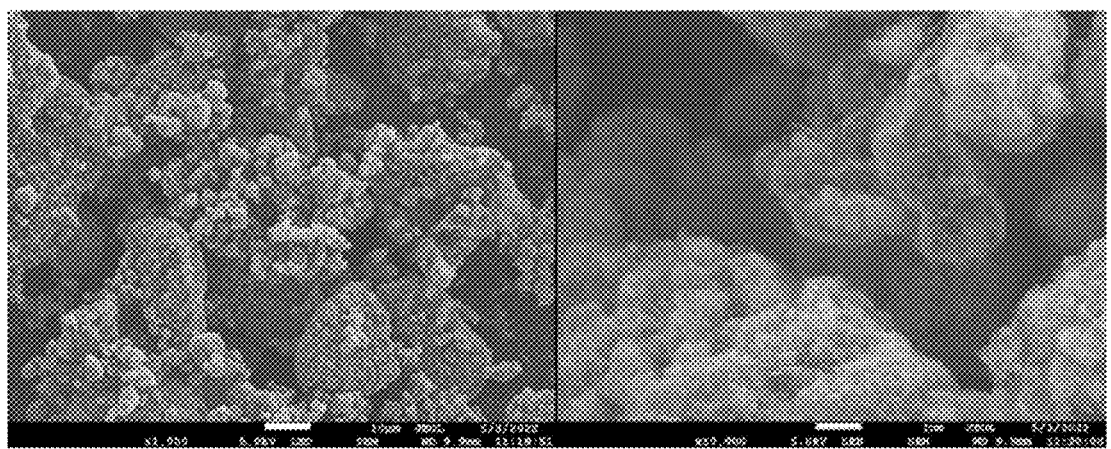
FIG. 3 is a scanning electron microscope (SEM) image of a porous carbon material used to manufacture a sulfur-carbon composite of Comparative Example 2. The left image is at a magnification of 1,000 times, and the right image is at a magnification of 10,000 times.

In FIGS. 2 and 3, SEM images of the porous carbon material used in Example 4 (FIG. 2) and Comparative Example 2 (FIG. 3) are shown, respectively.

[Preparation of Positive Electrode]

The positive electrode for lithium-sulfur batteries were prepared using the sulfur-carbon composites obtained from each of Examples 1 to 4, Comparative Example 1, and Comparative Examples 2. As the positive electrode active material, a sulfur-carbon composite was used in 90 wt %, as the conductive material, DENKA black was used in 5 wt %, and as the binder, styrene-butadiene rubber/carboxymethyl cellulose (weight ratio of SBR:CMC is 7:3) was used in 5 wt %. These materials were mixed in a solvent to prepare a cathode slurry composition.

The prepared cathode slurry composition was coated onto an aluminum current collector (thickness 20 μm) with a thickness of 350 μm, dried at 50° C. for 12 hours, and then pressed using a roll press machine to make the positive electrode.

In the positive electrode including the sulfur-carbon composites of Examples 1 to 3 and Comparative Example 1, the sulfur (S) content within the positive electrode was 67.5 wt %. For the sulfur-carbon composite applied in Example 4 and Comparative Example 2, the sulfur (S) content within the cathode was 63.0 wt %.

[Evaluation of the Average Tortuosity of the Positive Electrode]

Figure 4A:
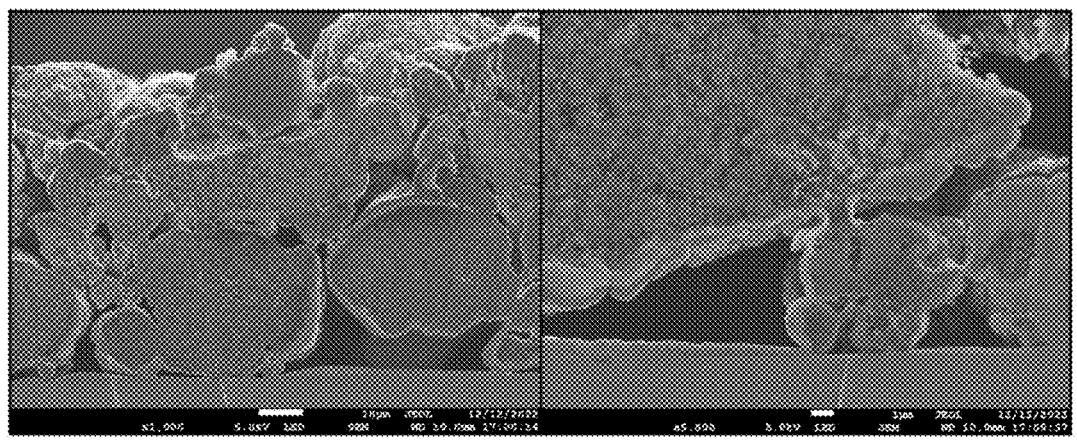
FIG. 4A is a scanning electron microscope (SEM) image of a vertical cross section of a positive electrode manufactured using a sulfur-carbon composite of Comparative Example 2. The left image is at a magnification of 1,000 times, and the right image is at a magnification of 5,000 times.

SEM images of vertical cross sections of the positive electrodes prepared using the sulfur-carbon composites of Comparative Example 2 and Example 4 are shown in FIGS. 4A (Comparative Example 2) and 5A (Example 4), respectively. From the SEM images obtained above, the average tortuosity of the positive electrode active material layer was evaluated according to the following method.

First, 1) in the obtained SEM image, a point on the surface of the current collector facing the positive electrode active material layer was arbitrarily selected, and the vertical distance (L) was measured by connecting the end points of the positive electrode active material layers in a direction perpendicular to the surface of the positive electrode from the point. Next, 2) the minimum distance (C) was measured along the boundary line between the particles (sulfur-carbon composite) located between the point arbitrarily selected in step 1) and the end point of the positive electrode active material layer. 3) Tortuosity (C/L) was calculated using the L and C values measured above. 4) After repeating the process of 1) to 3) by selecting at least three different points on the surface of the current collector, the average value of the obtained C/L values was calculated as the average tortuosity.

Tortuosity=[Curve Minimum Distance (C)/Vertical Distance (L)]

Using FIGS. 4B and 5B, the tortuosity measured at three points A, B, and C and the average tortuosity values of the three points are shown in TABLE 3 below.

TABLE 3

Figure 4B:
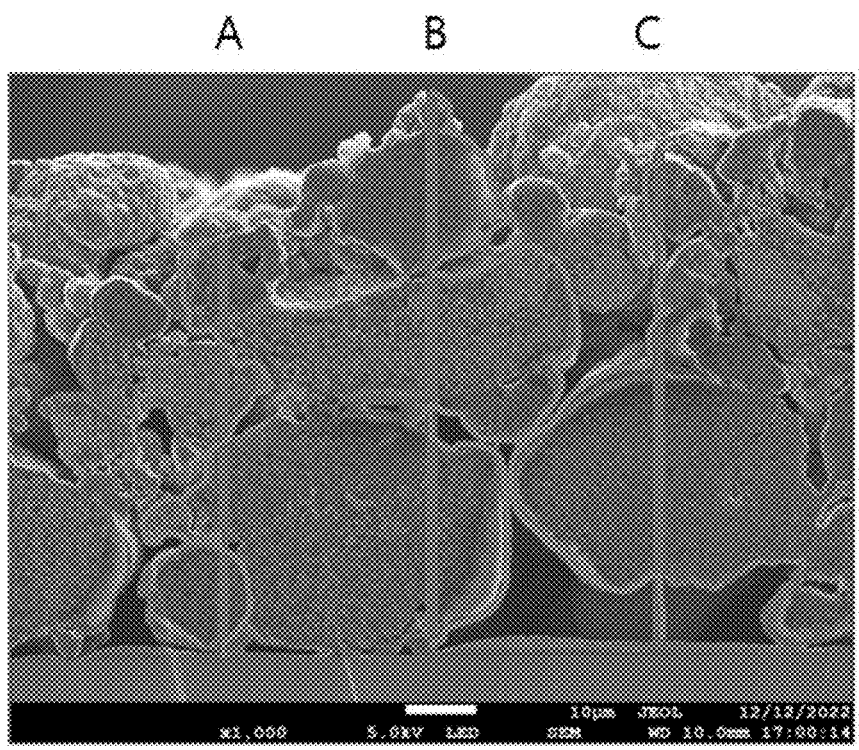
FIG. 4B shows the process for measuring the average tortuosity of the positive electrode active material layer using the image on the left of FIG. 4A.
Figure 5A:
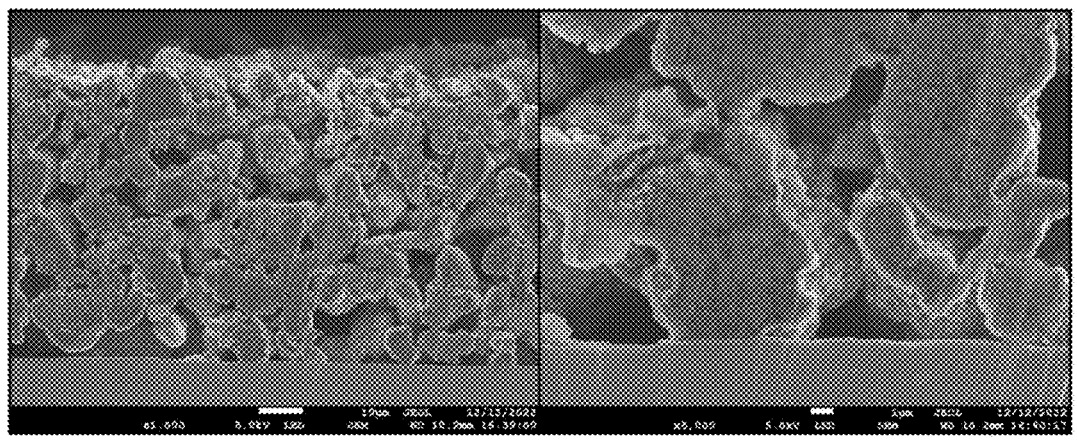
FIG. 5A is a scanning electron microscope (SEM) image of a vertical cross section of a positive electrode manufactured using a sulfur-carbon composite of Example 4. The left image is at a magnification of 1,000 times, and the right image is at a magnification of 5,000 times.
Figure 5B:
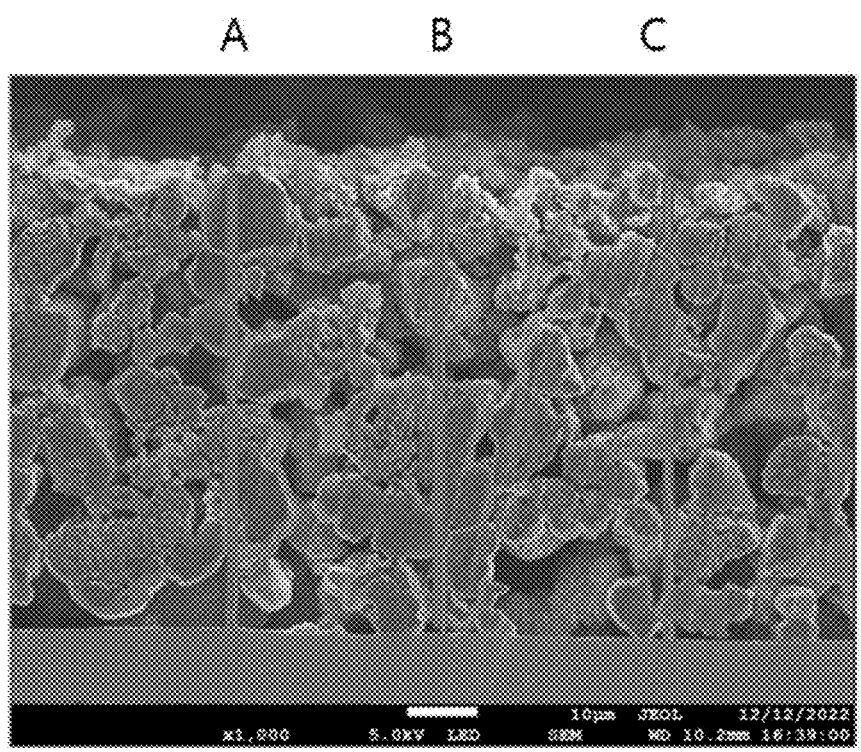
FIG. 5B shows the process for measuring the average tortuosity of the positive electrode active material layer using the image on the left of FIG. 5A.

| Sulfur-carbon composite | Positive electrode | | | | |
| --- | --- | --- | --- | --- | --- |
| | Cross-section image | Point A tortuosity (C/L) | Point B tortuosity (C/L) | Point C tortuosity (C/L) | Average tortuosity |
| Comparative Example 2 | FIG. 4B | 2.18 | 2.44 | 2.15 | 2.26 |
| Example 4 | FIG. 5B | 1.55 | 1.50 | 1.21 | 1.42 |

[Manufacture of Lithium-Sulfur Battery]

A positive electrode for a lithium-sulfur battery was prepared by using the positive electrode made of the sulfur-carbon composite obtained in each of Examples 1 to 4, Comparative Example 1 and Comparative Example 2 as follows.

The positive electrode manufactured as described above and a negative electrode were placed with a separator interposed between the positive electrode and the negative electrode to form an electrode assembly, and the electrode assembly was received in a pouch-type case and an electrolyte solution was filled to manufacture a lithium-sulfur battery.

For the negative electrode, a 35 μm thick lithium metal foil was used. For the separator, a 16 μm thick porous polyethylene was used. The electrolyte solution was prepared by adding 1M of $LiPF_6$ and 3 wt % of $LiNO_3$ to a mixed organic solvent of 2-methyl furan and dimethoxyethan (33/77 volume ratio).

The El/S in each manufactured battery was controlled to 3.1 g/g.

[Evaluation of Electrochemical Performance]

1.0C Discharge Capacity Evaluation

Each lithium-sulfur battery of Examples 1 to 4 and Comparative Examples 1 to 2 manufactured as described above was discharged at 0.5C in CC mode at 25° C. until 1.8V, and charged with 0.3C constant current until 2.5V, and then discharged at 1.0C, and the discharge capacity was measured and compared. The discharge capacity was measured based on the weight of sulfur (S) (mAh/gs (weight of sulfur)).

Figure 6:
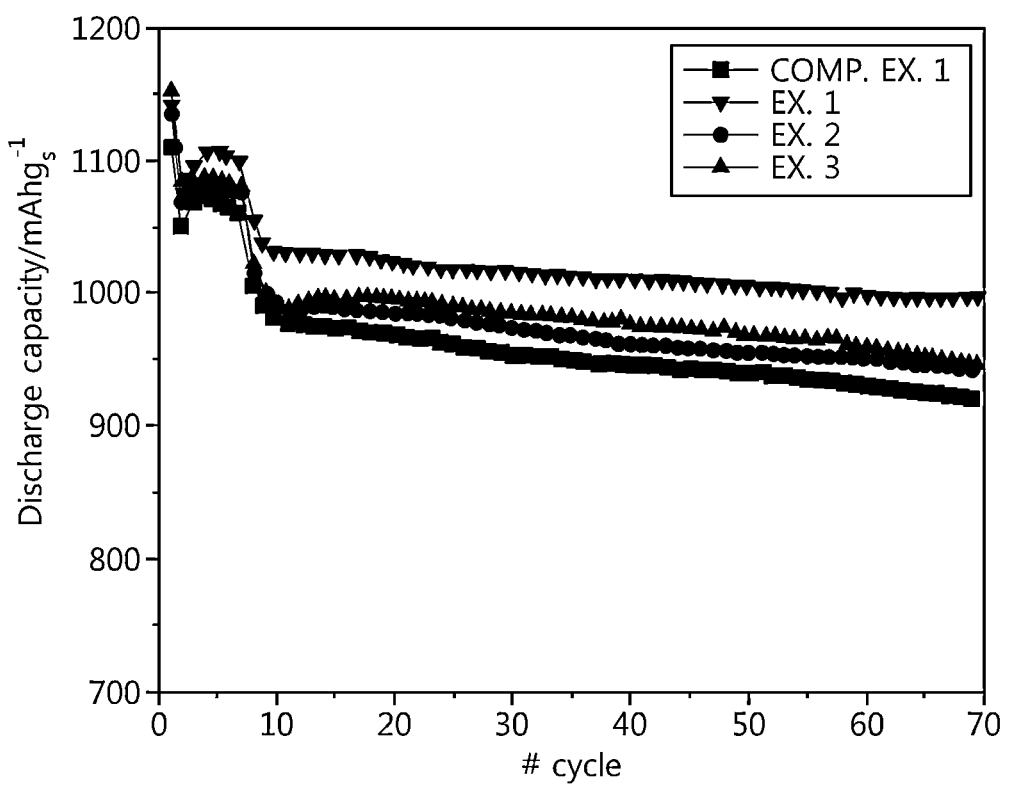
FIG. 6 is a graph showing the evaluation results of changes in discharge capacity during repeated charge/discharge cycles in Comparative Example 1 and Examples 1 to 3.
Figure 7:
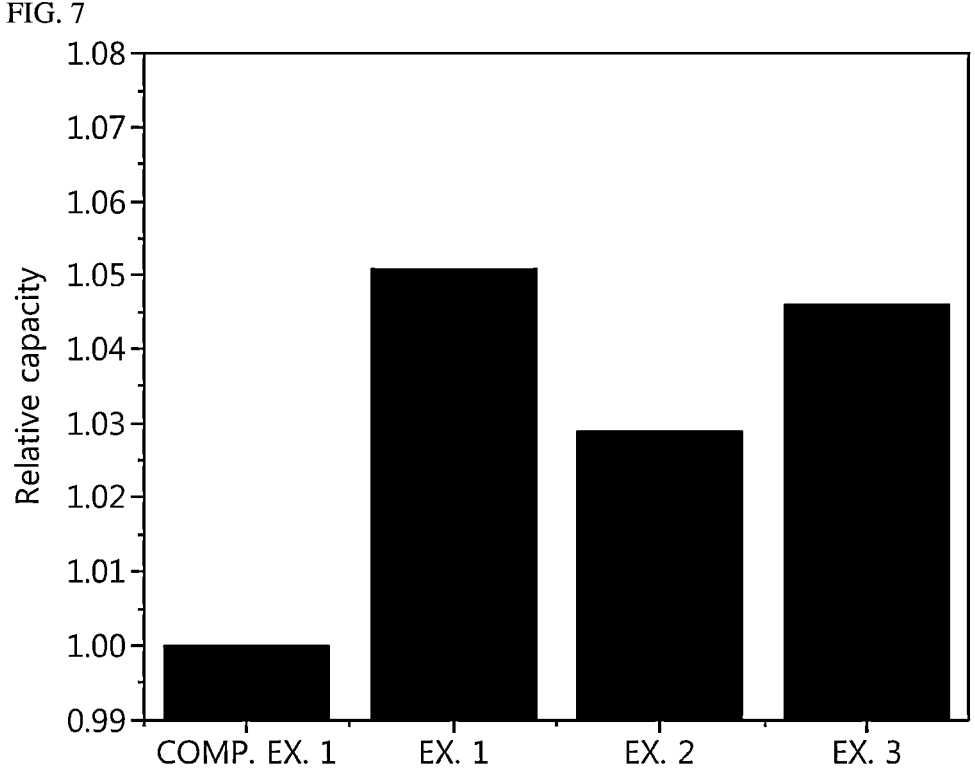
FIG. 7 is a graph showing the comparative evaluation results of relative capacity of Comparative Example 1 and Examples 1 to 3.
Figure 8:
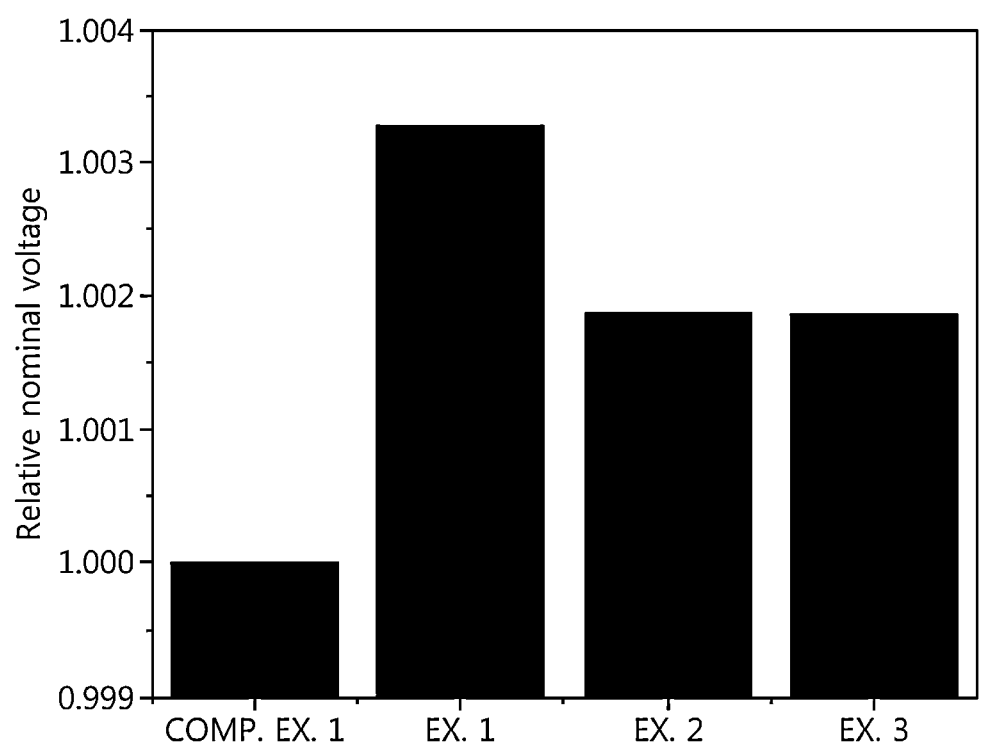
FIG. 8 is a graph showing the comparative evaluation results of relative nominal voltage of Comparative Example 1 and Examples 1 to 3.

FIG. 6 is a graph showing changes in discharge capacity during repeated charging/discharging, FIG. 7 shows the relative capacity of Examples 1 to 3 when the discharge capacity of Comparative Example 1 is 1, and FIG. 8 shows the relative nominal voltage of Examples 1 to 3 when the voltage of Comparative Example 1 is 1.

The following table shows the capacity measured at the initial discharge after charge.

TABLE 4

|  | Sulfur content in the sulfur-carbon composite | 1.0 C Discharge capacity (mAh/gs) |
| --- | --- | --- |
| Example 1 | 75 wt % | 1,030 |
| Example 2 | 75 wt % | 989 |
| Example 3 | 75 wt % | 996 |
| Example 4 | 70 wt % | 1,035 |
| Comparative Example 1 | 75 wt % | 976 |
| Comparative Example 2 | 70 wt % | 915 |

0.5C Discharge Capacity and Energy Density Evaluation

For each lithium-sulfur battery prepared as described above, the discharge capacity was measured after discharging to 1.8 V at a rate of 0.5 C in CC mode at 25° C. and charging to 2.5 V with a constant current of 0.5 C. The results are shown in TABLE 5 below. The discharge capacity was measured based on the weight of sulfur. (mAh/g (weight of sulfur)s)

Figure 9:
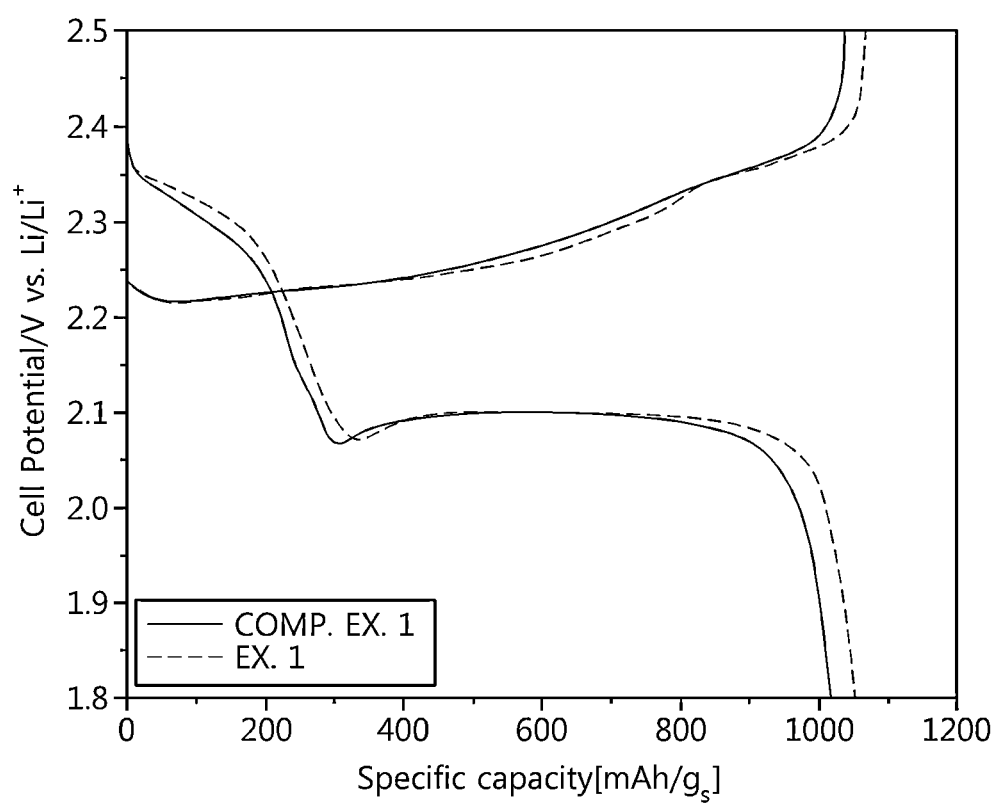
FIG. 9 is a graph showing the evaluation results of 0.5C discharge capacity of the batteries using sulfur-carbon composites of Example 1 and Comparative Example 1.
Figure 10:
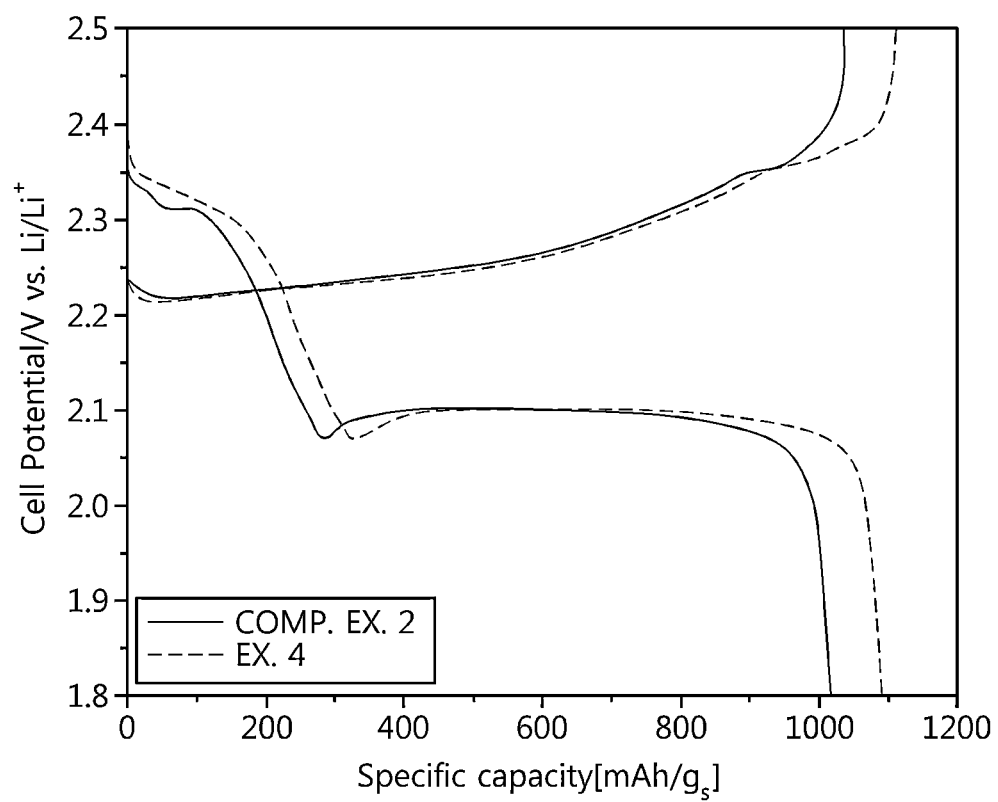
FIG. 10 is a graph showing the evaluation results of 0.5C discharge capacity of batteries using sulfur-carbon composites of Example 4 and Comparative Example 2.

In addition, the results of evaluating the 0.5C discharge capacity of the batteries using the sulfur-carbon composites of Example 1, Example 4, Comparative Example 1 and Comparative Example 2 are shown in FIGS. 9 and 10, respectively, and the measured discharge capacities are shown in TABLE 5 below.

The energy density was measured according to Equation 4 below using the measured 0.5C discharge capacity value, based on the energy density of Comparative Example 1, the relative value of the energy density of Example 1, and based on the energy density of Comparative Example 2, the relative values of the energy density of Example 4 are also shown in TABLE 5.

Energy density=[(Discharge capacity×Driving voltage)]/(cell weight)  [Equation 4]

TABLE 5

|  | Sulfur (S) content in the sulfur-carbon composite | 0.5 C Discharge Capacity (mAh/gs) | Energy Density (relative value) |
| --- | --- | --- | --- |
| Example 1 | 75 wt % | 1,073 | 1.06 |
| Comparative Example 1 | 75 wt % | 1,015 | 1.00 |
| Example 4 | 70 wt % | 1,092 | 1.07 |
| Comparative Example 2 | 70 wt % | 1,038 | 1.00 |

10-Second Power Density Evaluation

For each lithium-sulfur battery prepared as described above, after passing current for 10 seconds(discharge conditions: 1.5V, 5C), the power density was calculated according to Equation 5, and the results are shown in TABLE 6 below.

Power density(kW/kg)=[($V$ min)×(Max $C$-rate)×(Discharge capacity)]/(cell weight)  [Equation 5]

TABLE 6

|  | Target Property | 10-second power density (kW/kg) |
| --- | --- | --- |
| Example 1 | 2.1 kW/kg or more | 2.44 |
| Example 2 |  | 2.21 |
| Example 3 |  | 2.30 |
| Example 4 |  | 2.32 |
| Comparative Example 1 |  | 2.01 |
| Comparative Example 2 |  | 1.95 |

[Evaluation]

Referring to TABLE 2 and FIGS. 2 and 3, it can be confirmed that the porous carbon material having a BF ($D_{90}/D_{10}$) of 7 or less (FIG. 2) has a uniform particle size and the gap between the porous carbon materials is narrow compared to the porous carbon material having a large BF value (FIG. 3).

In addition, referring to TABLE 3, FIGS. 4A and 5A, when the positive electrode is made by using a sulfur-carbon composite in which sulfur ($S_8$) is supported in a porous carbon material having a small BF or a small size, it can be confirmed that the sulfur-carbon composite is evenly distributed in the positive electrode active material layer and the gap between the sulfur-carbon composite is narrowed, thereby increasing the utilization efficiency of sulfur in the positive electrode.

Accordingly, referring to TABLEs 4 to 6 and FIGS. 6 to 10, the lithium-sulfur battery according to an embodiment of the present disclosure can implement a large discharge capacity of 1,000 mAh/gs or more even at a high rate discharge of 1.0C. In addition, it was confirmed that even if the amount of the active material in the positive electrode was the same, the lithium-sulfur battery according to an embodiment of the present disclosure provided a higher energy density than Comparative Examples 1 and 2.

In particular, referring to TABLEs 4 to 6, if the sulfur (S) content is low, the gap between the porous carbon materials is large, and the sulfur-carbon composite was not uniformly distributed in the positive electrode (Comparative Example 2), the power density of the battery is low and thus, not suitable for high power characteristics when comparing the discharge capacity of the battery using the carbon-sulfur composite of Example 1 and Example 4. According to one embodiment of the present disclosure, the electrochemical activity was sufficiently improved without increasing the sulfur loading rate, and it was confirmed that the capacity of the battery could be increased accordingly. Through the above series of experiments, by applying a porous carbon material having a small size or a uniform particle size distribution as an active material carrier for a lithium-sulfur battery, sulfur (S) can be diffused uniformly, and thus, during charging and discharging of the battery, it was confirmed that the oxidation-reduction reaction of sulfur ($S_8$)←→$Li_2S$ was uniform, the capacity and charge density of the battery were improved, and excellent high-speed output performance was achieved.

[Evaluation as to Whether Positive Electrode Satisfies Equation 2]

Evaluation Example 1

SEM images of the upper surface of the positive electrode active material layer of the positive electrode manufactured using the sulfur-carbon composite of Example 1 and Comparative Example 1 were obtained. In this instance, the SEM images were obtained in 200 μm×200 μm size at 400× magnification and in 70 μm×70 μm size at 1,000× magnification based on the center of each of the obtained positive electrodes.

Subsequently, top five sulfur-carbon composites were selected according to the sulfur-carbon composite on an area basis in the obtained image of 200 μm×200 μm size, and bottom five sulfur-carbon composites were selected according to the sulfur-carbon composite on an area basis in the image of 70 μm×70 μm size.

The longest axis length in each selected sulfur-carbon composite was measured and their average was calculated, and the result of calculation according to the following Equation 2 is shown in the following TABLE 7.

$$X_L/X_S \leq 15 \quad \text{[Equation 2]}$$

In the above Equation 2, $X_L$ is the average value of longest axis lengths in the top five sulfur-carbon composites on the area basis in the top view image of the positive electrode active material layer, and $X_S$ is the average value of longest axis lengths in the bottom five sulfur-carbon composites on the area basis in the top view image of the positive electrode active material layer.

Each of FIGS. 11A and 11B shows the SEM image obtained from the positive electrode of Example 1, and in FIG. 11A, the longest axis of the selected top five sulfur-carbon composites are indicated, and in FIG. 11B, the longest axis of the selected bottom five sulfur-carbon composites are indicated. Each of FIGS. 12A and 12B shows the SEM image obtained from the positive electrode of Comparative example 1, and in FIG. 12A, the longest axis of the selected top five sulfur-carbon composites is indicated, and in FIG. 12B, the longest axis of the selected bottom five sulfur-carbon composites is indicated.

In this instance, it was confirmed that a particle having the longest axis length of less than 1 μm in each SEM image was not a sulfur-loaded porous carbon material, i.e., a sulfur-carbon composite, and thus, was excluded when selecting the bottom five sulfur-carbon composites.

TABLE 7

| | $X_L/X_S$ | Whether or not Equation 2 is satisfied (True/Fail) |
|---|---|---|
| Example 1 | 3.5 | True |
| Comparative Example 1 | 20.8 | Fail |

Evaluation Example 2

After a lithium-sulfur battery was manufactured using the positive electrode, to evaluate a change in whether or not Equation 2 is satisfied by the repeated charge and discharge, the following experiment was performed.

First, the lithium-sulfur battery was manufactured as follows.

The lithium-sulfur battery was manufactured by placing the positive electrode manufactured using the sulfur-carbon composite of Comparative Example 1 and a negative electrode with a separator interposed between the positive electrode and the negative electrode to make an electrode assembly, receiving the electrode assembly in a pouch type case and injecting an electrolyte solution. For the negative electrode, a 35 μm thick lithium metal foil was used. For the separator, a 16 μm thick porous polyethylene was used. The electrolyte solution was prepared by adding 3 wt % of $LiNO_3$ and 1M $LiPF_6$ to a mixed organic solvent of 2-methyl furan and dimethoxyethane (33/77 volume ratio). A pouch cell including the positive electrode and the negative electrode manufactured as described above was fabricated. In each battery, El/S was controlled to 3.1 g/g condition.

Each lithium-sulfur battery manufactured as described above was discharged at 0.5C in a CC mode at 25° C. up to 1.8 V and charged by a constant current of 0.3C up to 2.5 V, and discharging and charging was repeatedly performed at 1.0C for 200 cycles. In this instance, it was confirmed that the discharge capacity was maintained at 80% or more based on the initial capacity 100% using a charge and discharge tester.

After the last charge, the lithium-sulfur battery at SOC 75% was disassembled in a glove box under an Ar atmosphere, and the positive electrode was separated. The surface of the separated positive electrode was washed using DME and dried, and whether or not Equation 2 is satisfied was evaluated by the same method as Evaluation example 1.

Figure 13A:
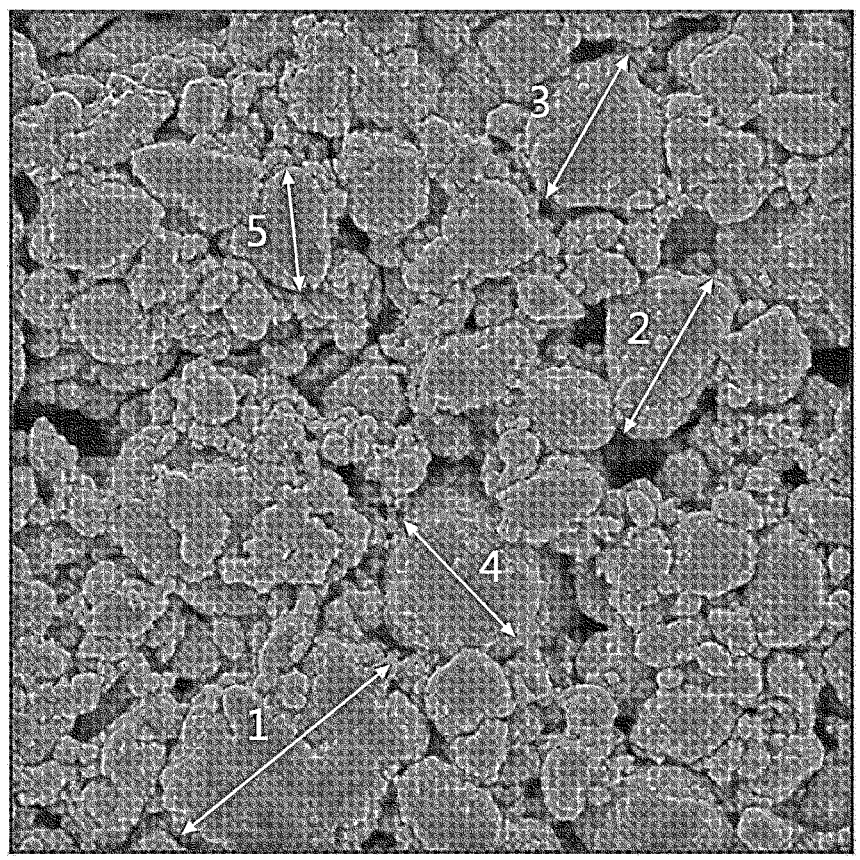
FIG. 13A is a scanning electron microscope (SEM) image at a magnification of 400 times of the top surface of the positive electrode active material layer disassembled from the lithium-sulfur battery using the sulfur-carbon composite of Comparative Example 1 (200 μm×200 μm) after 200 cycles of charge-discharge, showing the longest axis of the selected top five sulfur-carbon composites.
Figure 13B:
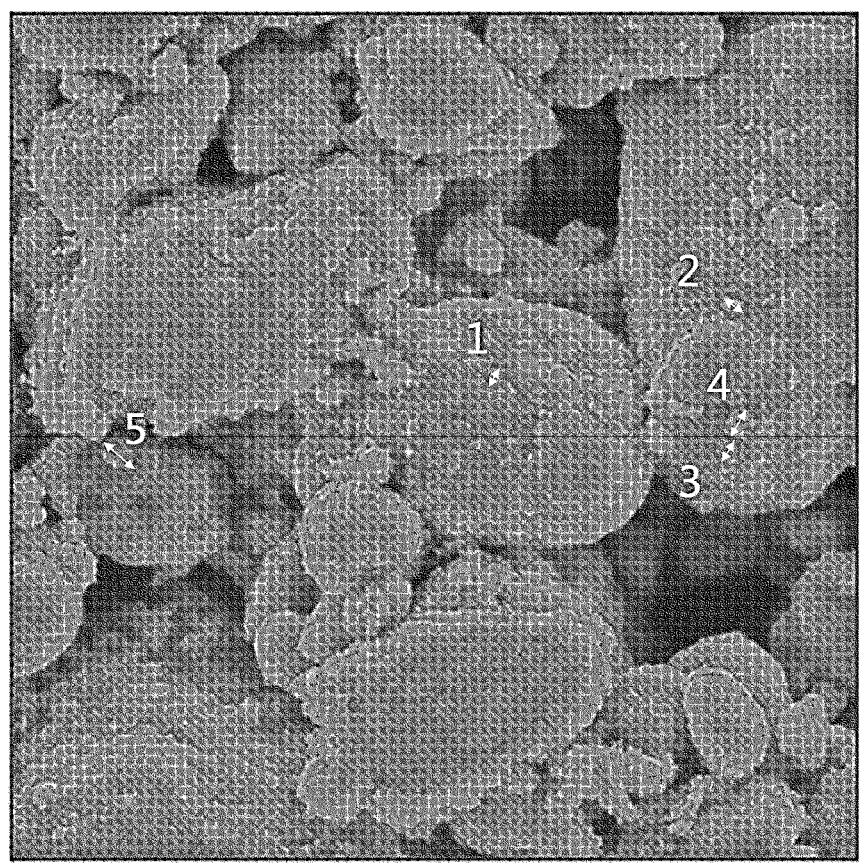
FIG. 13B is a scanning electron microscope (SEM) image at a magnification of 1,000 times of the top surface of the positive electrode active material layer disassembled from the lithium-sulfur battery using the sulfur-carbon composite of Comparative Example 1 (70 μm×70 μm) after 200 cycles of charge-discharge, showing the longest axis of the selected bottom five sulfur-carbon composites.

Each of FIGS. 13A and 13B shows the SEM image obtained as described above, and in FIG. 13A, the longest axis of the selected top five sulfur-carbon composites is indicated, and in FIG. 13B, the longest axis of the selected bottom five sulfur-carbon composites is indicated. The result of calculation according to the following Equation 2 is shown in the following TABLE 8.

TABLE 8

| | (Evaluation after battery disassembly) | |
|---|---|---|
| | $X_L/X_S$ | Whether or not Equation 2 is satisfied (True/Fail) |
| Comparative Example 1 | 23.2 | Fail |

As can be seen from the above TABLEs 7 and 8, it was confirmed that the positive electrode manufactured using the sulfur-carbon composite of Comparative Example 1 did not satisfy Equation 2 immediately after the manufacture and after the repeated charge and discharge of the battery using the same.

Through the follow-up experiment, it was confirmed that the lithium-sulfur battery using the positive electrode failing to satisfy Equation 2 was poor in terms of capacity, discharging density and high-speed output performance of the battery, and presumably, it results from low reactivity due to non-uniform distribution of sulfur (S) in the positive electrode.

Although the present disclosure has been hereinabove described with regard to a limited number of embodiments and drawings, the present disclosure is not limited thereto, and it is obvious to those skilled in the art that various changes and modifications may be made thereto within the technical aspect of the present disclosure and the appended claims and equivalents thereof.

What is claimed is:

1. A positive electrode active material for a lithium-sulfur battery, comprising:
   a sulfur-carbon composite,
   wherein the sulfur-carbon composite comprises a porous carbon material and a sulfur-based material disposed on at least a portion of an inside of pores and a surface of the porous carbon material,
   wherein the sulfur-based material comprises at least one of sulfur ($S_8$) or a sulfur compound, and
   wherein the porous carbon material satisfies one or more of the following conditions:
   (1) a sum of particle size $D_{10}$ and particle size $D_{90}$ is 30 µm or more and 60 µm or less; and
   (2) a broadness factor (BF) satisfying Equation 1 is 7 or less:

Broadness factor (BF)=(particle size $D_{90}$ of the porous carbon material)/(particle size $D_{10}$ of the porous carbon material)   [Equation 1].

2. The positive electrode active material for the lithium-sulfur battery according to claim 1, wherein the porous carbon material comprises at least one selected from the group consisting of activated carbon, carbon black, carbon nanotubes and graphene.

3. The positive electrode active material for the lithium-sulfur battery according to claim 1, wherein a particle size $D_{50}$ of the porous carbon material is 100 µm or less.

4. The positive electrode active material for the lithium-sulfur battery according to claim 1, wherein an amount of sulfur(S) is 60 wt % or more and less than 100 wt % based on 100 wt % of the sulfur-carbon composite.

5. The positive electrode active material for the lithium-sulfur battery according to claim 1, wherein the porous carbon material is a product from which a raw material porous carbon material is centrifugally milled and filtered through a sieve having a mesh size 2.8 to 4 times of a $D_{50}$ particle size of the porous carbon material.

6. The positive electrode active material for the lithium-sulfur battery according to claim 1, wherein the porous carbon material satisfies the broadness factor (BF) of 4 to 7.

7. A positive electrode for a lithium-sulfur battery, comprising:
   a current collector; and
   a positive electrode active material layer on at least one surface of the current collector,
   wherein the positive electrode active material layer comprises the positive electrode active material of claim 1.

8. A positive electrode for a lithium-sulfur battery, comprising:
   a current collector; and
   a positive electrode active material layer on at least one surface of the current collector,
   wherein the positive electrode active material layer comprises a plurality of sulfur-carbon composites,
   wherein the positive electrode satisfies Equation 2:

$X_L/X_S \leq 15$   [Equation 2]

wherein $X_L$ is an average value of longest axis lengths in five largest sulfur-carbon composites on an area basis in a top view image of the positive electrode active material layer, and
   wherein $X_S$ is an average value of longest axis lengths in five smallest sulfur-carbon composites on the area basis in the top view image of the positive electrode active material layer.

9. The positive electrode for the lithium-sulfur battery according to claim 8, wherein the top view image of the positive electrode active material layer is a scanning electron microscope (SEM) image of an upper surface of the positive electrode active material layer.

10. The positive electrode for the lithium-sulfur battery according to claim 8, wherein the bottom five sulfur-carbon composites excludes a particle having the longest axis length of less than 1 µm.

11. The positive electrode for the lithium-sulfur battery according to claim 8, wherein the top five sulfur-carbon composites and the bottom sulfur-carbon composites are independently selected from an area of 50 µm×50 µm to an area of 1,000 µm X 1,000 µm in the top view image.

12. The positive electrode for the lithium-sulfur battery according to claim 8, wherein the positive electrode active material layer has an average tortuosity of 1.7 or less.

13. The positive electrode for the lithium-sulfur battery according to claim 8, wherein an amount of sulfur(S) in the positive electrode active material layer is 60 wt % or more and less than 100 wt % based on 100 wt % of the positive electrode active material layer.

14. The positive electrode for the lithium-sulfur battery according to claim 8, wherein a sulfur loading of the positive electrode is 1.67 mg/cm² to 2.92 mg/cm².

15. The positive electrode for the lithium-sulfur battery according to claim 8, wherein each of the plurality of sulfur-carbon composites comprises a porous carbon material, and
   wherein the porous carbon material satisfies one or more of the following conditions:
   (1) a sum of particle size $D_{10}$ and particle size $D_{90}$ is 60 µm or less; and
   (2) a broadness factor (BF) satisfying Equation 1 is 7 or less:

Broadness factor (BF)=(particle size $D_{90}$ of the porous carbon material)/(particle size $D_{10}$ of the porous carbon material).   [Equation 1].

16. A lithium-sulfur battery, comprising:
   an electrode assembly comprising the positive electrode of claim 8, a negative electrode and a separator between the positive electrode and the negative electrode; and
   an electrolyte.

17. The lithium-sulfur battery according to claim 16, wherein a ratio (El/S) of a total weight of the electrolyte to a total weight of sulfur(S) in the positive electrode is 3.5 g/g or less.

18. The lithium-sulfur battery according to claim 16, wherein a 10-second power density is 2.1 kW/kg or higher.

19. The lithium-sulfur battery according to claim 16, wherein a discharge capacity of the lithium-sulfur battery is 1,000 mAh/gs or more per a weight of sulfur(S) in the positive electrode at 1.0 C discharge rate.

20. A lithium-sulfur battery, comprising:
   an electrode assembly comprising the positive electrode of claim 15, a negative electrode and a separator between the positive electrode and the negative electrode; and
   an electrolyte,
   wherein the particle size $D_{10}$ and the particle size $D_{90}$ are values measured when a state of charge (SOC) of the lithium-sulfur battery is 70% to 100%.

* * * * *